United States Patent
Cruz et al.

(10) Patent No.: US 11,691,085 B2
(45) Date of Patent: *Jul. 4, 2023

(54) SYSTEM AND METHOD FOR ENHANCING PARTICIPATION IN ONLINE MULTIPLAYER SESSIONS

(71) Applicant: Microsoft Technology Licensing, LLC, Redmond, WA (US)

(72) Inventors: Ruben Omar Cardona Cruz, Seattle, WA (US); Keith R. Kline, Bothell, WA (US); Warren Alpert, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 145 days.

This patent is subject to a terminal disclaimer.

(21) Appl. No.: 17/240,225

(22) Filed: Apr. 26, 2021

(65) Prior Publication Data

US 2021/0260489 A1     Aug. 26, 2021

Related U.S. Application Data

(63) Continuation of application No. 16/034,023, filed on Jul. 12, 2018, now Pat. No. 11,020,671.

(51) Int. Cl.
  *A63F 13/795* (2014.01)
  *A63F 13/355* (2014.01)
  (Continued)

(52) U.S. Cl.
  CPC .......... *A63F 13/795* (2014.09); *A63F 13/355* (2014.09); *H04L 65/1069* (2013.01); *H04L 65/61* (2022.05); *H04L 67/131* (2022.05)

(58) Field of Classification Search
  CPC .... A63F 13/795; A63F 13/355; H04L 67/131; H04L 65/61; H04L 65/1069
  See application file for complete search history.

(56) References Cited

U.S. PATENT DOCUMENTS 9,101,836 B1 * 8/2015 Brenden ................. A63F 13/86
9,521,170 B2 * 12/2016 Bader-Natal ........ H04L 12/1813
(Continued)

OTHER PUBLICATIONS

"Notice of Allowance Issued in European Patent Application No. 19737359.0", dated Jul. 14, 2022, 7 Pages.
(Continued)

*Primary Examiner* — William H McCulloch, Jr.
*Assistant Examiner* — Ankit B Doshi
(74) *Attorney, Agent, or Firm* — Rainier Patents, P.S.

(57) ABSTRACT

Session participation in online content streams or activities like multiplayer games is enhanced through management of session tracking and automated queuing of players via a central system between host/streamer client device and guest player client devices. Spectators viewing a content stream or waiting to join a multiplayer activity over a network via a game/streaming service request to be placed in a queue to participate in a session of the content stream or activity as guest players with the host/streaming user. Sessions are tracked to determine start and end events. Sets of prior guest players are removed from sessions when the sessions end, and sets of queued spectators are automatically added to the start of a new session of the content stream or activity as guest players. Queuing may be automatically prioritized for users based on user characteristics, and guest players removed at the end of sessions may be automatically re-queued.

20 Claims, 7 Drawing Sheets

(51) Int. Cl.
*H04L 65/1069* (2022.01)
*H04L 65/61* (2022.01)
*H04L 67/131* (2022.01)

(56) References Cited

U.S. PATENT DOCUMENTS

| | | | | |
|---|---|---|---|---|
| 11,020,671 | B2* | 6/2021 | Cruz | A63F 13/355 |
| 2002/0103920 | A1* | 8/2002 | Berkun | G06F 16/48 |
| | | | | 707/E17.108 |
| 2012/0254764 | A1* | 10/2012 | Ayloo | G06Q 30/02 |
| | | | | 715/738 |
| 2013/0268592 | A1* | 10/2013 | Yerli | G06Q 50/00 |
| | | | | 709/204 |
| 2014/0006499 | A1* | 1/2014 | Ren | H04L 67/1082 |
| | | | | 709/204 |
| 2015/0321098 | A1* | 11/2015 | van der Laan | A63F 13/355 |
| | | | | 463/31 |
| 2017/0105038 | A1* | 4/2017 | Subramanya | H04N 21/439 |
| 2017/0266552 | A1* | 9/2017 | Paradise | A63F 13/798 |
| 2017/0282082 | A1* | 10/2017 | Hubbard | G06Q 10/101 |
| 2017/0296929 | A1* | 10/2017 | Chandrasekaran | A63F 13/75 |
| 2017/0368454 | A1* | 12/2017 | Sivak | A63F 13/35 |
| 2018/0169528 | A1* | 6/2018 | Hinoshita | A63F 13/795 |

OTHER PUBLICATIONS

"Office Action Issued in Indian Patent Application No. 202047054083", dated Sep. 20, 2022, 7 Pages.
"Notice of Allowance Issued in European Patent Application No. 19737359.0", dated Oct. 20, 2022, 2 Pages.

* cited by examiner

SYSTEM AND METHOD FOR ENHANCING PARTICIPATION IN ONLINE MULTIPLAYER SESSIONS

BACKGROUND

Video game streamers, content creators, game players, and game influencers earn a portion of their follower base by interacting with their followers. One type of interaction is playing games or participating in activities with their followers who desire to interact with them (e.g., by viewing their media streams or participating in multi-player games). Typically, a host or streamer may send messages to multiple other players and/or viewers on the platform indicating they want to play a game or otherwise interact together, and then manually go through each individual response to the message, and send the responding viewers/players guest player invitations to the game or to a party to organize the group. Assuming everyone accepts their invite, the host/streamer would start the game (i.e., "match-make" into a game).

In some cases, the game might have an open ability to join, where players can follow the host/streamer on the platform and join on their open game lobby. Another option for the host/streamer would be to make a looking for group (LFG) post on a platform. When watchers apply for the LFG, the streamer can confirm a set of users and gather them into a platform party, then start the game. After the game, the user would leave the game lobby and start over, or they could kick the party members which frees up slots in the LFG for the host to go and manually confirm more members into the party to start again.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods for enhancing session participation in online streams/activities are performed by systems and apparatuses. Users may play titles (e.g., video games or other online content) at client devices that execute the titles. Large numbers of users or spectators may wish to join multiplayer games or view live video content streams of those titles being played that are streamed from the streamer client devices to the spectators' own client devices. Streamer and spectator users may facilitate session participation through automatic queuing and management thereof. Accordingly, management of user queuing and session participation is performed herein. For instance, session participation in online content streams/activities is enhanced through management of session tracking and automated queuing of players via a central system between a streamer client device and guest player client devices. Spectators may view a content stream/game (i.e., an activity generally) over a network via a streaming service and request to be placed in a queue to participate in a session of the activity as guest players with the streaming user. Sessions may be tracked to determine start and end events. Sets of prior guest players are removed or kicked from sessions when the sessions end, and sets of queued spectators are automatically added to the start of new sessions of the content activity as guest players. Queuing may be automatically prioritized for users based on user characteristics and/or credentials. Guest players that are removed at the end of sessions may be automatically re-queued for participation in future sessions.

Further features and advantages, as well as the structure and operation of various examples, are described in detail below with reference to the accompanying drawings. It is noted that the ideas and techniques are not limited to the specific examples described herein. Such examples are presented herein for illustrative purposes only. Additional examples will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1:
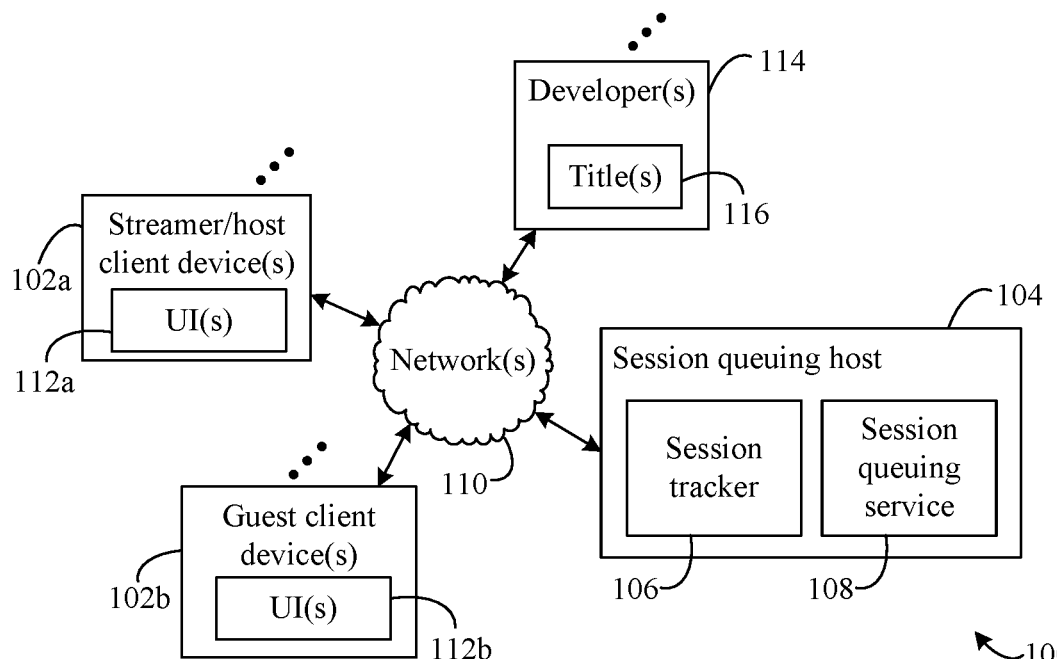
FIG. 1 shows a block diagram of a networked system for enhancing session participation through queue management, according to an example embodiment.

The features and advantages of embodiments will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description discloses numerous embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the discussion, unless otherwise stated, adjectives such as "substantially," "approximately," and "about" modifying a condition or relationship characteristic of a feature or features of an embodiment of the disclosure, are understood to mean that the condition or characteristic is defined to be within tolerances that are acceptable for operation of the embodiment for an application for which it is intended.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures and drawings described herein can be spatially arranged in any orientation or manner Additionally, the drawings may not be provided to scale, and orientations or organization of elements of the drawings may vary in embodiments.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

Section II below describes example embodiments for enhancing session participation through queue management. In particular, Section II.A describes example systems for session participation through queue management and Section II.B provides example user interface embodiments. Section III below describes example mobile device and computing device embodiments that may be used to implement features of the embodiments described herein. Section IV below describes additional examples and advantages, and Section V provides some concluding remarks.

II. Example Embodiments for Enhancing Session Participation Through Queue Management Methods, systems, apparatuses, devices, and computer program products are provided herein for enhancing session participation through queue management. A user or a group of users may desire to play or participate in an online activity session, such as for a video stream or game, with another user or group of users where session capacity is at a premium for the given activity. That is, the number of users that wish to play or participate may exceed a maximum number of users that can participate at any given time. Therefore, because multiplayer experiences typically have a limited set of player spots, multiplayer experiences run into scenarios where there are more people wanting to play than are allowed into the experience. Whether it is playing with friends, random strangers, a game streaming audience, or it is a very important person/player (VIP) wanting to play with a community, this problem can occur. If a streamer wants to engage with their audience in play sessions as guest players, or a multiplayer game initiator wants to play a game with friends, few options are currently available to handle this overflow of participants. When a game is over, if the host/streamer wants to take a new set of guest players from their group or audience, the host/streamer has to remove all the guest players of the current game (if possible in that game), or leave the game "lobby" outright and begin the process again. This does not allow any sort of priority to be applied to the viewers/players—whoever joins first gets into the game.

By automatically queuing players who have expressed interest in session participation, and by automatically cycling through those users over a period of time and a number of sessions, the described embodiments provide for efficiently and automatically satisfying as many requests for session participation as possible. Additionally, the users waiting in queues are in an asynchronous state so they can do other things while they wait. Accordingly, the described embodiments enable efficient session setup and participation via automatic queuing of players.

For example, a session queuing service may execute on a session queuing system host (e.g., a processing system or server) that resides on a network between a session host/streamer client device (e.g., a client device of a content streamer, a content creator, a game player such as a VIP or service platform personnel, a game influencer, etc.) and client devices of other users that wish to participate in sessions of games or streams as guest players. The session queuing service is configured to automatically queue the other users, add the other users as guest players, and remove guest players for sessions of games/content streams. The session queuing service positioned between the host/streamer and user/participant client devices is enabled to receive requests from the other users to join sessions of activities (e.g., games) streamed by the streamer client device, and to automatically queue users of client devices and insert them into the sessions as guest players. In this way, the session queuing service is enabled to centrally manage session participation for any number of the other users over any number of titles by different developers in a manner that is specific to each instance of streamed content.

For instance, a user who is playing a title on a client device (e.g., a streamer/host client device) may stream their title play such that this content stream may be viewed over a network by one or more other users at respective client devices (e.g., guest client devices). Other users may be enabled to simply view the content stream, while in other cases, other users may be enabled to view and interact with the title session being streamed, e.g., during sessions which may be pre-defined or streamer-defined portions of the stream. That is, other users may join a title session of the user playing the title at the streamer client device. Likewise, users in a lobby for a multiplayer game instance created by a host may be joined by such users.

The described embodiments provide for platform level features that can work for any number of different title streams or games (e.g., "activities"), and by enabling automatic assembling of participants into sessions, benefits are provided, including improving user experiences, reducing system load for clients, reducing network traffic loads, etc. That is, a streamer/host user is enabled to post a looking for group (LFG) message that does not require the host to confirm participation applicants, putting them into a party, inviting them into a game, and then attempting to repeat the process session after session, game after game. The LFG post may be thus utilized to act as a first-in-first-out queue of players that want to participate in a session of an activity with the streamer, according to embodiments. LFG posts may also be accessible to title developers if they wish to integrate the described embodiments into their titles from the platform detailed herein. That is, the streamer/host can create a game-specific LFG that is of this type of activity. For example, when the streamer/host enters a game, an option may be provided to gather the LFG into their game lobby. Initially, a user may request to view a stream for an activity or join a group to play a multiplayer activity, such as a game, being played or initiated by the streamer/host user. The session queuing service, or alternatively a gaming/streaming service such as Xbox Live® from Microsoft Corporation of Redmond, Wash., may be configured to associate the user with a multiplayer game, video stream, or other activity by including the user in an activity group, e.g., as a guest player, a spectator of the stream, etc. Users may request participation in a session and be automatically queued. The title developer is thus enabled to pull users from the top of the queue to participate automatically in a session as guest players. If a user in the queue logs off or becomes unavailable, the described embodiments are configured to automatically remove the unavailable user from the queue. After the completion of a session, automatic removal of the guest players from the lobby/LFG may be performed, and the next set of users from the top of the queue may be pulled into a new session as guest players. The session queuing service, or alternatively a streaming service, may be configured to track when multiplayer sessions start, end, or change in between, thus providing the ability to automatically determine when the addition and/or removal of players should take place at specified moments.

Accordingly, the described platform features allow efficient and seamless queuing and cycling of players for session participation such that the streamer and participants are relieved of the burden involved with managing the process. The described embodiments may be applied to any type of streaming/session participation scenario, as well as multi-player interaction scenarios where a host player creates a game session or activity without actively streaming, that include without limitation: a scenario where a streamer wants to play with audience members, a scenario where a VIP gamer advertises game sessions in a social context and needs to queue participant users, a scenario where a game player wants to play with friends but the collection of friends exceeds the play size of the activity (i.e., so some players need to queue and wait for their turn), scenarios where gaming clubs having a large member base want to organize play sessions with multiple sessions to play in available, and/or the like.

Embodiments also allow for queuing and session management of unintegrated titles to be improved. For instance, a streamer/host for an unintegrated title is still provided access to an improved game/stream flow by using the described platform as a virtual meeting place to form parties where the streamer/host starts the process of accepting users into a party from the top of the queue. The selected users may be automatically included in a party, where the streamer/host enabled to insert the whole party into the game or activity for participation in a session. After the session ends, because the title is unintegrated, the streamer/host may perform the additional step of leaving the game lobby and starting again, and thus the action of kicking the existing guest players from the session and selecting a new set of users from the queue as guest players for a new session is accomplished with a single button click of a streamer/host user interface before repeating the party process described above.

Integration of titles with the described embodiments for enhanced session participation through queue management is virtually seamless, and the session queuing services operate as minimally opinionated services for how the users are queued. The session queuing hosts are scalable to handle very large numbers of users and session participants for different games or content streams. Queuing may be prioritized according to streamer/host preferences, e.g., based on queued users being followers, being friends, having certain in-title attributes including any type of statistic or information related to in-title performance of a user, having subscriptions, having relatively higher times spent viewing streams of the streamer/host, being enrolled in pay-to-play programs, having an amount of viewing/spectating rewards received, and/or the like.

In other words, the embodiments disclosed herein provide enhanced session participation through queue management. These and further embodiments are described in greater detail as follows.

A. Example Systems for Session Participation Through Queue Management

In embodiments, systems and devices may be configured in various ways for enhanced session participation through queue management. For instance, FIG. 1 is a block diagram of a queuing system 100, according to embodiments. Queuing system 100 is configured to enable enhanced session participation through queue management, according to embodiments. As shown in FIG. 1, queuing system 100 includes a streamer/host client device 102a, a guest client device 102b, a session queuing host 104, and a title developer server 114 which may communicate with each other over a network 110. It should be noted that any numbers of streamer client devices, guest client devices, and session queuing hosts, and/or title developer servers may be present in various embodiments. Additionally, any combination of the components illustrated in FIG. 1 may be present in queuing system 100, according to embodiments.

As noted above, streamer/host client device 102a, guest client device 102b, and session queuing host 104, as well as title developer server 114, are communicatively coupled via network 110. Network 110 may comprise any type of communication links that connect computing devices and servers such as, but not limited to, the Internet, wired or wireless networks and portions thereof, point-to-point connections, local area networks, enterprise networks, and/or the like.

Title developer server 114 may comprise one or more server computers or computing devices, which may include one or more distributed or "cloud-based" servers. Title developer server may be configured to enable developers to develop and/or publish titles, such as video games, interactive applications, etc. Accordingly, title developer server 114, or storage associated therewith, may include one or more titles 116. Title(s) 116 may include code or applications for executing and/or supporting execution of titles developed by a developer. Title(s) 116 may be provided for download to a client device, electronically, over a network as described herein, and/or may be encoded on computer readable storage media to be read/accessed by a client device, to execute a title.

Session queuing host 104 may comprise one or more server computers or computing devices, which may include one or more distributed or "cloud-based" servers. In embodiments, session queuing host 104 may be associated with, or may be a part of, a game or streaming service system or platform such as Xbox Live®. User of client devices may be authenticated for the game/streaming services or platforms, such as via a user interface (UI) 112a of streamer/host client device 102a and/or via a UI 112b of guest client device 102b via network 110, and upon authentication, streamer/host client device 102a may stream content or create a multiplayer game instance, guest client device 102a may view streamed content, and streamer/host client device 102a and guest client device 102a may join in multi-user activities such as games. Session queuing host 104 is configured to receive requests from client devices, such as via a user interface (UI) 112a of streamer/host client device 102a and/or via a UI 112b of guest client device 102b via network 110 to add users to groups and/or queues for participation in activities and sessions thereof. For example, a streamer/host user may be playing a title and streaming live content of the title via streamer/host client device 102a, while another user may be a spectator viewing the streaming live content in a virtual lobby, or otherwise, for the title at guest client device 102b. In another example, the streamer/host user may be creating a multiplayer game/activity the title via streamer/host client device 102a, while another user may be a spectator viewing the streaming live content in a virtual lobby, or otherwise, for the title at guest client device 102b.

As illustrated, session queuing host 104 includes a session tracker 106 and a session queuing service 108. It is noted that session tracker 106 may be located remotely from session queuing host 104 in embodiments, such as in a remote and/or associated system for game or streaming service system or platform (not shown for brevity and illustrative clarity) communicatively connected via network 110. It is also contemplated herein that while only a single instance of session tracker 106 and session queuing service 108 are shown in FIG. 1 for brevity and illustrative clarity, multiple instances of these components may be present in embodiments.

Session queuing host 104 is configured to receive requests, at session queuing service 108, to participate in a multiplayer game or a title stream from spectating/viewing users of the title, e.g., from UI 112b of guest client device 102b. Session queuing service 108 is also configured to queue the requesting users/client devices for insertion into a session of the game/stream and to insert sets of queued users into sessions of games/streams. Accordingly, session queuing service 108 is configured to operate as a service (e.g., an LFG service) to facilitate group formation and session participation therefor. Requests to participate in the game/title stream from spectating/viewing users may be received by session queuing service 108 either before or after a streamer/host user of streamer/host client device 102a activates or enables queuing. For instance, while streaming a title, the streamer/host user may note, e.g., via UI 112a, that many requests are being received for spectator user participation in a session of the stream, and the queuing of spectators for insertion into a session of the game/stream may then be activated by the host/streamer user. In such cases, session queuing service 108 may be configured to keep track of requesting spectators and the order of their respective requests prior to being queued such that when the streamer/host enables queuing, the FIFO ordering is maintained. In one example, requesting users may be placed in the queue before queuing is activated by the streamer/host to maintain ordering when or if activation occurs, while the queue may be cleared by the streamer/host or when the stream/game ends. In some embodiments, the queuing of spectators may be enabled upon launch of the title by the streamer/host user. It is also contemplated that that option to request queuing for participation may only be provided to spectators, e.g., via UI 112b, subsequent to queue activation by the streamer/host, e.g., via UI 112a. In such scenarios, a notification may be provided to the spectating users via UI 112b, e.g., by highlighting or activating a selectable option for requesting to join a session, by message, etc.

Session tracker 106 is configured to track sessions of games and content streams. That is, session tracker 106 is configured to monitor sessions to determine when sessions start, end, or change in between states. Session tracker 106 may provide indications of session states and changes thereof to session queuing service 108. Accordingly, session queuing service 108 is configured to determine when new sessions are to begin, to provide alerts of imminent sessions, to insert sets of users into the beginning of streaming sessions as guest players, to remove or kick guest players from sessions at their completion, etc.

Session tracker 106 and/or session queuing service 108 may each be implemented in hardware or hardware combined with one or both of software and/or firmware, and may be configured to perform any functions/operations described herein for enhancing participation in online games, content streams, and/or activities through management of session tracking and automated queuing.

Streamer/host client device 102a and/or guest client device 102b may be any type of computing device or computing system, including a game console (e.g., any type of Xbox™ or Xbox One™ console from Microsoft Corporation of Redmond, Wash., any type of PlayStation® console of Sony Corporation, etc.), a terminal, a personal computer, a laptop computer, a tablet device, a smart phone, etc., that may be used by users to play, stream, and/or spectate titles from title developers. Titles may be distributed by developers electronically or via computer readable storage media that may be inserted or uploaded into the described client devices for execution of the titles. As described herein, streaming and spectating users may utilize session queuing host 104. Streamer/host client device 102a and/or guest client device 102b are configured to provide user authentication/credential information over network 110 to a game/streaming service system or platform, e.g., via UI 112a/UI 112b. Additionally, a user may utilize UI 112a or UI 112b for streaming, spectating, session queuing and participation, and/or the like, as described herein. In embodiments, streamer/host client device 102a and/or guest client device 102b may include a stored instance of such a UI, received from session queuing host 104 and/or from game/streaming service system or platform, or as a component of streamer/host client device 102a and/or guest client device 102b. In embodiments, UI 112a and/or UI 112b may be any type of service/application UI, browser, client or electronic communication application, messaging application, portal, and/or the like. In some examples, UI 112a and/or UI 112b may be a component of a title from a title developer.

It should be noted that streamer/host client device 102a may be configured to operate as a guest client device like guest client device 102b, and that guest client device 102b may be configured to operate as a streamer client device like streamer/host client device 102a. That is, the different client devices described herein are not limited in their functionality and operation by their labels which are attributed as such only for purposes of illustration and description herein. Additionally, streamer/host client device 102a and/or guest client device 102b may each be configured to play titles without streaming or spectator viewing, as will be understood by persons of skill in the art(s) having the benefit of this disclosure.

Note that as described herein, embodiments for enhancing participation in online activities through management of session tracking and automated queuing are applicable to any type of system where a game/streaming service system or platform communicates with client devices over a network. One example is where session queuing host 104 and/or session queuing service 108 are "cloud" implementations, applications, or services in a network architecture/platform. A cloud platform includes a networked set of computing resources, including servers, routers, etc., that are configurable, shareable, provide data security, and are accessible over a network such as the Internet. Cloud applications run on these computing resources, often atop operating systems that run on the resources, for entities that access the applications over the network. A cloud platform may support multi-tenancy, where cloud platform-based software services multiple tenants, with each tenant including one or more users who share common access to software services of the cloud platform. Furthermore, a cloud platform may support hypervisors implemented as hardware, software, and/or firmware that run virtual machines (emulated computer systems, including operating systems) for tenants. A hypervisor presents a virtual operating platform for tenants.

Figure 2:
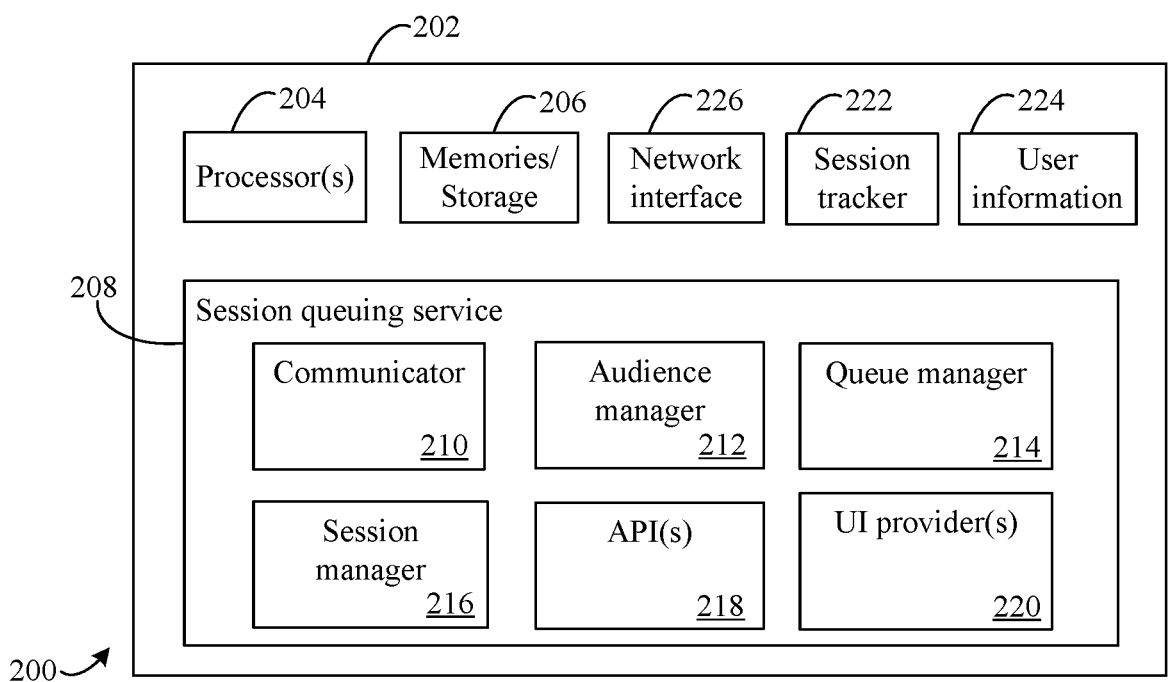
FIG. 2 shows a block diagram of a session queuing host system for enhancing session participation through queue management, according to an example embodiment.

Accordingly, a session queuing host system, such as session queuing host 104, may be configured in various ways for improvements and enhancements for participation in online content streams or activities through management of session tracking and automated queuing for users of streamer client devices and/or guest client devices. For example, FIG. 2 is a block diagram of a session queuing service host system 200 ("system 200" herein) configured for improvements and enhancements for participation in online content streams or activities through management of session tracking and automated queuing. System 200 is an embodiment of queuing system 100 of FIG. 1. System 200 is described as follows.

System 200 includes a session queuing host 202, which may be an embodiment of session queuing host 104 of FIG. 1, and may be any type of server computer or computing device, as mentioned elsewhere herein, or as otherwise known, including cloud-based server implementations. As shown in FIG. 2, system 200 and session queuing host 202 includes one or more of a processor ("processor") 204, one or more of a memory and/or other physical storage device ("memory") 206, one or more network interfaces ("network interface") 226, and a session queuing service 208 that may be an embodiment of session queuing service 108 of FIG. 1. System 200 may also include a session tracker 222, which may be an embodiment of session tracker 106 of FIG. 1 described above, as well as user information 224. System 200 may also include additional components (not shown for brevity and illustrative clarity) including, but not limited to, components and subcomponents of other systems herein, such as UI 112a and/or UI 112b, etc., as well as those described below with respect to FIGS. 9 and 10, such as an operating system.

Processor 204 and memory 206 may respectively be any type of processor circuit or memory that is described herein, and/or as would be understood by a person of skill in the relevant art(s) having the benefit of this disclosure. Processor 204 and memory 206 may each respectively comprise one or more processors or memories, different types of processors or memories, remote processors or memories, and/or distributed processors or memories. Processor 204 comprises circuitry that is configured to execute computer program instructions such as but not limited to embodiments of session queuing service 208, which may be implemented as computer program instructions for enhancement participation in online content streams or activities through management of session tracking and automated queuing, etc., as described herein. Memory 206 is configured to store such computer program instructions/code, as well as to store other information and data described in this disclosure including, without limitation, title information, user information, tracking information, etc.

Network interface 226 may be any type of wired and/or wireless network adapter, modem, etc., configured to enable system 200 to communicate with other devices over a network, such as communications between system 200 and other devices utilized in a network as described herein (e.g., streamer/host client device 102a, guest client device 102b, and/or title developer server 114) over a network such as network 110 as described above with respect to FIG. 1.

User information 224 may include, without limitation, information regarding a user, a user's account (e.g., login credentials, a user alias or handle, etc.), a user's client device, a user's network, titles played or viewed as a spectator by the user, user rewards earned, and indications of users being logged into system 200 or to a game/streaming service system or platform. User information 224 may also include criteria data such as information regarding tracked time viewing content streams, spectator participation, title events viewed during a content stream, a set of followers of the user, a set of other users the users is following, subscriptions, a set of friends of the user, memberships (e.g., club or community memberships), in-title attributes/data of the user or in-title characters of the user, and/or any other types of criteria data. In embodiments, such criteria data may be used to determine if a user for qualifies for queue prioritization.

Session queuing 208 includes a plurality of components for performing the techniques described herein for enhancements in session participation through queue management, e.g., as an LFG service. As shown, session queuing service 208 includes communicator 210, an audience manager 212, a queue manager 214, a session manager 216, application programming interfaces (APIs) 218, and a UI provider 220. While shown separately for illustrative clarity, in embodiments, one or more of communicator 210, audience manager 212, queue manager 214, session manager 216, APIs 218, and/or UI provider 220, may be combined together and/or as a part of other components of system 200. In some embodiments, less than all of the components of session queuing service 208 illustrated in FIG. 2 may be included. In software implementations, one or more components of session queuing service 208 and/or session queuing host 202 may be stored in memory 206 and may be executed by processor 204.

Communicator 210 is configured to receive and/or transmit electronic communications for session queuing service 208 of system 200. For instance, communicator 210 is configured to receive requests from users of client devices regarding session participation, queuing activation commands, indicia of users spectating, session state information, requests for UIs, etc., as described herein, as via network interface 226. Similarly, session queuing service 208 of system 200 is configured to issue, transmit, and/or provide, notifications to users, UIs, and/or the like, as described below, via communicator 210.

Audience manager 212 may be configured to track users that are viewing streams, in lobbies of titles, are joined in groups for game participation or stream viewing, etc. For example, spectating users may be logged in to, or authenticated and online, a game/streaming service system or platform associated with session queuing service 208 and system 200. The service system or platform may provide mechanisms for users to watch active streams, congregate in lobbies for specific games or titles, join in group rooms, and/or the like. Audience manager 212 may be configured users that are actively viewing streams or otherwise present with respect to a title such that only users present in this manner are eligible to be queued, and/or remain queued, for session participation.

Queue manager 214 may be configured to queue users for participation in game/stream sessions. Queue manager 214 may be configured to insert users into a queue, and remove users from a queue, based on information from audience manager, as noted above. Queue manager 214 may be configured to manage a FIFO queuing structure, or any other type of queuing structure, and may be configured to manage queuing for multiple titles and any number of users. When queued users are inserted into a session, queue manager 214 is configured to remove the users from the queue. In embodiments, queue manager 214 is configured to prioritize users in queues based on criteria information as described above with respect to user information 224. Queue manager 214 may also tentatively queue users based on requests for session participation before a streamer/host user expressly activates queuing for participation in a session of a stream. In some embodiments, guest players from completed sessions that are kicked or removed by session manager 216, described below, may be automatically re-queued by queue manager 214.

Session manager 216 may be configured to insert queued users into sessions as guest players and to remove guest players from completed sessions. Session manager 216 may be configured to add a set of queued users to a session, e.g., at the beginning of the session, where a set of users to be inserted into a session is based on a maximum limit of concurrent participants for a session excluding the streamer/host or is based on a preference of a streamer/host user specifying a number of users in the set that is less than or equal to the maximum. In scenarios where there are fewer queued users than the maximum limit and/or the preference of the streamer/host user, the number of queued users may be inserted into the session. Session manager 216 may be configured to add and/or remove users/guest players from beginning and completed sessions, respectively, based on session information from session tracker 222. In embodiments, session tracker 222 and session manager 216 may be included together, conceptually or otherwise, as a single component. Session manager 216 is configured to automatically add and/or remove queued users and/or guest players without additional, or any, inputs being provided.

API 218 may include one or more APIs to perform specific functions related to tracking and communications described herein. In embodiments, one or more APIs of API 218 may be included in, or utilized by, a component(s) of session queuing host 202, such as but not limited to, session queuing service 208 and its subcomponents. For example, an API of APIs 218 may be utilized with session tracker 222 to communicate session states of games and content streams. Similarly, other APIs may be used to facilitate other network communications and notifications. In embodiments, notifications or alerts may be provided to spectating/viewing users as a single API call, i.e., a single message communication. In embodiments, such an API may be configured to concurrently issue communications for large numbers of spectating users, e.g., up to 100,000 spectators, or more.

UI provider 220 is configured to provide UIs to client devices. For example, UI provider 220 may be configured to provide UI 112a (or a portion thereof, or content/information therefor) to streamer/host client device 102a and/or to provide UI 112b (or a portion thereof, or content/information therefor) to guest client device 102b. Further embodiments of UI 112a and UI 112b are described in additional detail below.

Figure 3:
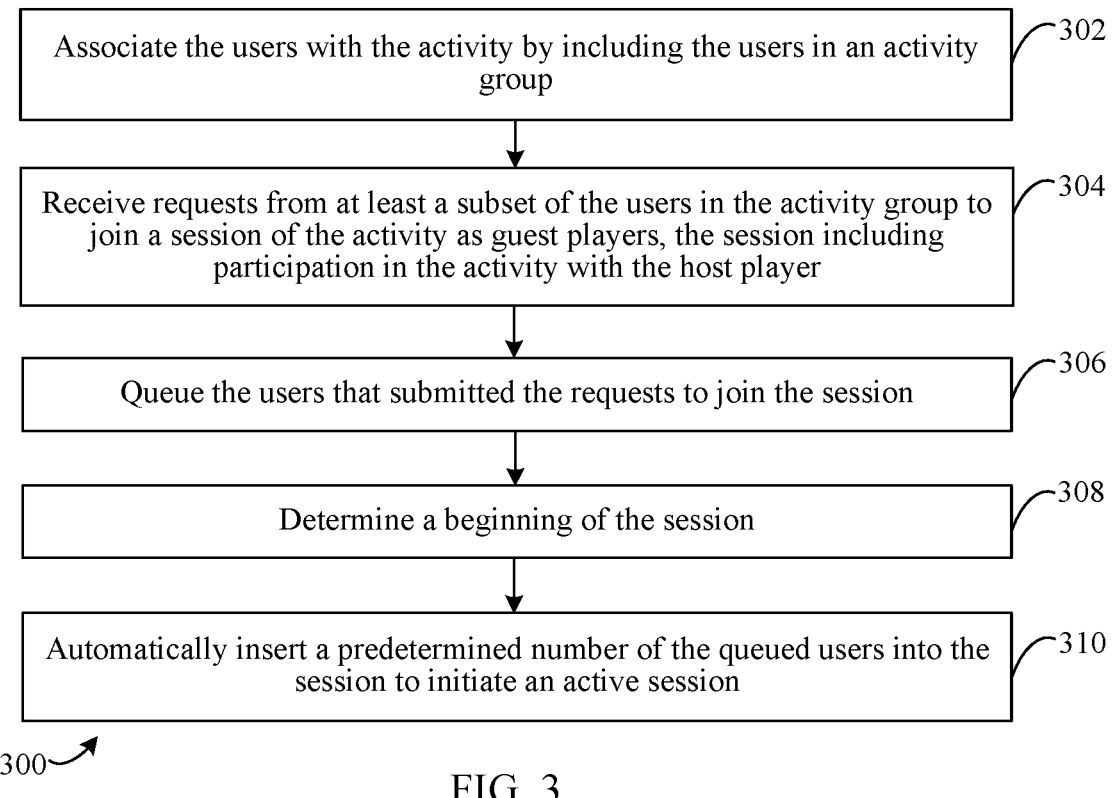
FIG. 3 shows a flowchart for enhancing session participation through queue management, in accordance with an example embodiment.

Session queuing service 208 may operate in various ways to enable enhancements for participation in online content streams or activities such as multiplayer games through management of session tracking and automated queuing. For instance, FIG. 3 shows a flowchart 300 for enhancements of participation in online content streams or activities through management of session tracking and automated queuing, according to an example embodiment. Session queuing service 208 may operate according to flowchart 300, in an embodiment. Further structural and operational examples will be apparent to persons skilled in the relevant art(s) based on the following description. Flowchart 300 is described as follows with respect to queuing system 100 of FIG. 1 and system 200 of FIG. 2.

Flowchart 300 begins at step 302. In step 302, users are associated with an activity of a host player by including the users in an activity group. For example, audience manager 212 of session queuing service 208 in FIG. 2 is configured to associate users with a game or video stream of a host player by denoting the users as belonging to an activity group. Users to be grouped may include those that are authenticated with, i.e., logged in to, a game/streaming service or platform, such as an online service like Xbox Live®. The grouped users may be viewing the video stream as spectators, may be present in a lobby of the title being streamed, may be present in a group lobby to join a multiplayer game, and/or the like. In embodiments, audience manager 212 may store indications of users being grouped this way in memory 206. Accordingly, user eligibility to be queued for participation in a session of a game or content stream can be administered so as to require users to be present in association with the game or content stream.

In step 304, requests are received from at least a subset of the users in the activity group to join in a session of the game/video stream as guest players, the session including participation in an activity with the host player. For instance, queue manager 214 of FIG. 2 may be configured to receive requests to join a session of a game/video stream from the authenticated users described in step 302. These users may request to join a session by selecting an option on a UI, such as UI 112b, which provides a communication message to queue manager 214 indicating that the user wishes to join in a session. In some embodiments, less than all authenticated users may provide requests. Activities may include game play, demonstrations, virtual reality experiences, and/or the like.

In step 306, the users that submitted the requests to join the session are queued. For example, queue manager 214 may be configured to place the requesting users in a queue. Queues may include queuing structures such as FIFO queues which may be stored in a storage such as memory 206 by queue manager 214. In FIFO queue examples, the user that corresponds to the first received request is placed at the top, or head, of the queue—in other words, the order of the received requests corresponds to the users' placement in the queue. In embodiments, prior to queuing the requesting users, queue manager 214 is configured to verify that the requesting users are still present with respect to the video stream, e.g., utilizing the stored indications of grouped users from audience manager 212.

In step 308, a beginning of the session is determined. For instance, session manager 216 is configured to determine when a session is ready begin and/or when a session begins. As described above, session manager 216 may receive information from session tracker 222. When session manager 216 determines that a session is ready to begin, session manager 216 may be configured to provide indications to queued users that will be inserted into the next session that is about to begin, or to all queued users.

In step 310, a predetermined number of the queued users are automatically inserted into the session to initiate an active session. For example, session manager 216 is configured to automatically insert a set of queued users into the session. The number of queued users inserted into the session may be predetermined as the maximum number allowable in a session simultaneously, or as a number corresponding to the preference of the streamer/host, and in some embodiments may be one or more of the users in the queue when that number of users is less than either of the other numbers. Session manager 216 may be configured to automatically insert the set of queued users into the session one at a time until the specified/maximum number is reached (e.g., in a predetermined order or in an order corresponding to indications from users for participation acceptance as described herein), or the queued users of the set may be inserted at the same time or approximately the same time. When the users are inserted as guest players, the session may automatically become active. In embodiments, after insertion of the queued players, the streamer/host may activate the session via a host UI, e.g., UI 112*a*.

By automatically inserting queued users into sessions, network traffic is reduced significantly. For example, repeating or consecutive sessions may take place seamlessly without additional communications between client devices 102*a*/102*b* and session queuing host 202 for rejoining new games/streams/groups/lobbies, selection different users to insert into the next session, etc. Furthermore, the continuity of activities enabled by the described embodiments provides for less down time in setup of activities which decreases power consumption of client devices.

Moreover, and as previously noted, the session queuing service is centrally positioned between the streamer and guest client devices, and is enabled to dynamically manage queuing and session participation based on the specific preferences of the streamer/host users, for each such user over each available title supported by a game/streaming service system or platform. In this way, the session queuing service is enabled to efficiently manage session participation and improve the content streaming system, and the users' experience thereof, for any number of users. Thus, customization for queuing management and session participation is enabled, per-title and per-streamer/host, from a centralized service.

Still further, an API of API 218 of FIG. 2 may also be configured to issue, in real-time, one-to-many communications including alerts/notifications, to users, queued users, and/or guest players. As similarly described above, the centrally located session queuing service is configured to system performance with respect to queue management and session participation, as well as network utilization. Network traffic and load is further significantly reduced by the described embodiments as the described session queuing service is configured to issue single notifications related to queuing and session participation to all the client devices of authenticated users. That is, alerts and notices are distributed in a manner, e.g., via APIs 218 as noted above, that does not require individual notices to spectating users from the service, from a title, or from a streamer/host. The network traffic reduced according to the described title queuing services and systems is significant as the number of users supported for participating in games or viewing the streaming of a title, queuing, and session participation can be in the thousands to the hundreds of thousands.

After being inserted into a session, guest players may participate in an activity with the streamer/host users until the session is completed. Upon completion of a session, session queuing service 208 of FIG. 2 is configured to automatically and seamlessly repeat the session initiation and queued user insertion.

Figure 4:
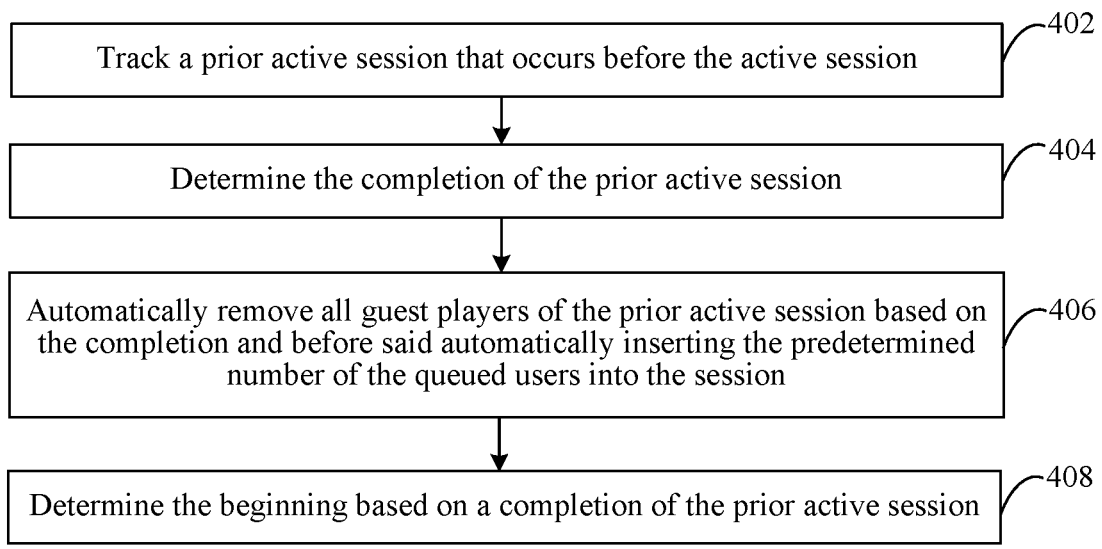
FIG. 4 shows a flowchart for enhancing session participation through queue management, in accordance with an example embodiment.

For instance, FIG. 4 shows a flowchart 400 for enhancements of participation in online content streams or activities through management of session tracking and automated queuing, according to an example embodiment. Session queuing service 208 may operate according to flowchart 400. Flowchart 400 may be a further embodiment of flowchart 300 of FIG. 3. Further structural and operational examples will be apparent to persons skilled in the relevant art(s) based on the following description. Flowchart 400 is described as follows with respect to queuing system 100 of FIG. 1 and system 200 of FIG. 2.

Flowchart 400 begins at step 402. In step 402, a prior active session that occurs before the active session is tracked. For example, session manager 216 of FIG. 2 may be configured to track a session via session tracker 222, as described above. In embodiments, session manager 216 may receive session information from session tracker 222 originating from a game/streaming service system or platform such that the stream, and the session, are directly or indirectly monitored to obtain tracking information.

In step 404, the completion of the prior active session is determined. For example, session manager 216 is configured to obtain tracking information as described above for step 402. Session manager 216 may determine completion of sessions based on the tracking information. Session manager 216 is thus configured to wait to perform removal of guest players from sessions until after a prior session is determined to be complete.

In step 406, all guest players of the prior active session are automatically removed based on the completion and before said automatically inserting the predetermined number of the queued users into the session. For example, session manager 216 may be configured to automatically remove guest players from sessions when the sessions are completed. Session manager 216 is thus configured to wait to perform insertion of queued users into a new session as guest players until after the removal of guest players from a prior session.

In step 408, the beginning is determined based on a completion of the prior active session. For instance, as noted above, before a new session is activated, a prior session of the activity is completed. When the prior session completes, session tracker 222 is configured to notify session manager 216. In embodiments, session tracker 216 may be configured to determine when to begin a new active session, e.g., via insertion of queued users as guest players, responsive to the completion of the prior active session.

In embodiments, the steps of flowchart 400 may be performed automatically, e.g., without inputs from a user, to seamlessly and efficiently manage session participation and flow.

Accordingly, flowchart 300 and flowchart 400 (and session queuing service 208 of system 200) enable improvements and enhancements for participation in online content streams or activities through management of session tracking and automated queuing by having a session queuing service 208 configured to operate as an automatic queue manager and session manager for any number of sessions and games/streams for titles of different developers over any number of users. The embodiments provide for efficient, network traffic/load reducing notifications and integration of users into activity sessions.

Figure 6:
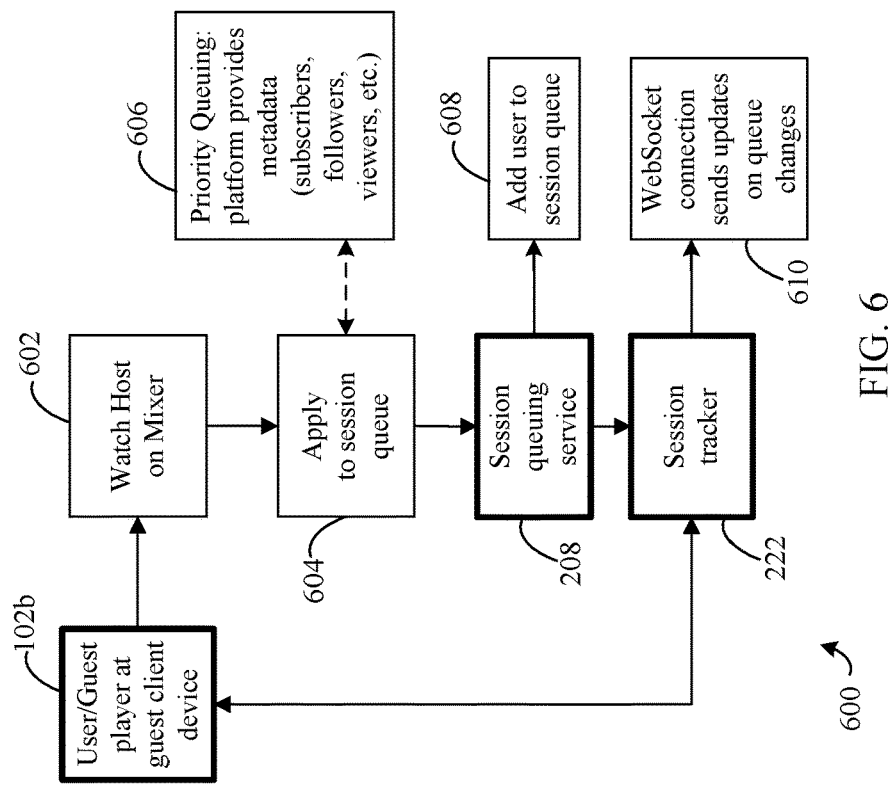
FIG. 6 shows a flow diagram for enhancing session participation through queue management, in accordance with an example embodiment.
Figure 5:
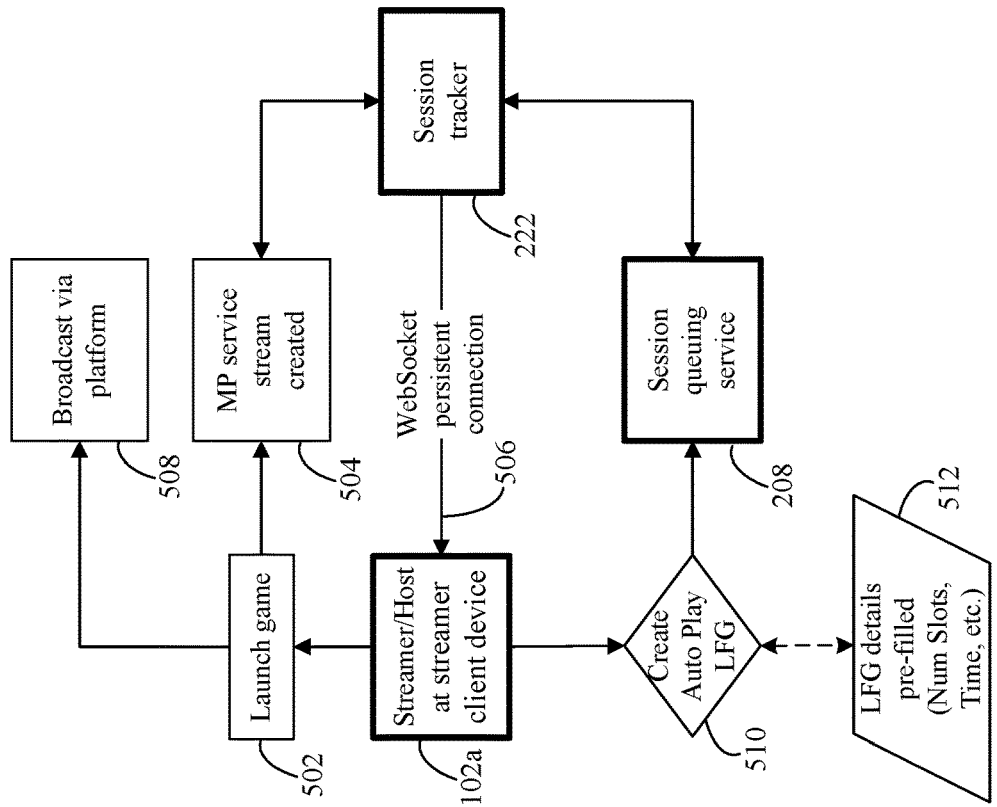
FIG. 5 shows a flow diagram for enhancing session participation through queue management, in accordance with an example embodiment.
Figure 7:
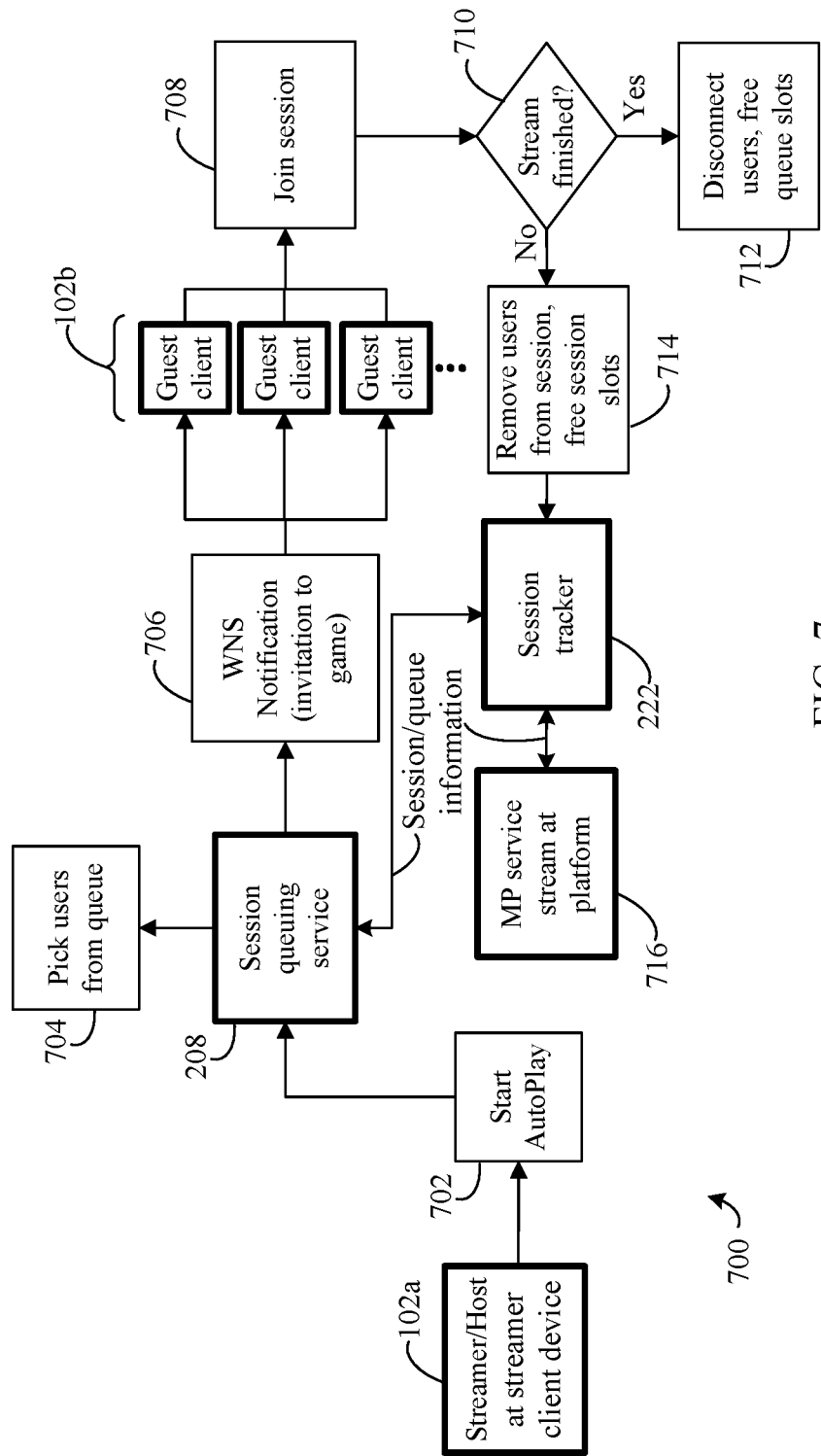
FIG. 7 shows a flow diagram for enhancing session participation through queue management, in accordance with an example embodiment.

FIG. 5, FIG. 6, and FIG. 7 illustrate flow diagrams according to the described embodiments. FIG. 5 shows a flow diagram 500, FIG. 6 shows a flow diagram 600, and FIG. 7 shows a flow diagram 700, each being for enhancements in participation in online content streams or activities through management of session tracking and automated queuing, according to example embodiments. For illustration, the described flow diagrams are associated with respect to the embodiments described above. Session queuing service 208 may operate according to flow diagram 500, flow diagram 600, and/or flow diagram 700. Flow diagram 500, flow diagram 600, and/or flow diagram 700 may be further embodiments of flowchart 300 of FIG. 3 and/or flowchart 400 of FIG. 4. Further structural and operational examples will be apparent to persons skilled in the relevant art(s) based on the following description.

Flow diagram 500 of FIG. 5 is described as follows with respect to queuing system 100 of FIG. 1 and system 200 of FIG. 2 and to a streamer client device, such as streamer/host client device 102a of FIG. 1.

A host launches a multiplayer title at step 502, e.g., via streamer/host client device 102a, which the host desires to play with other users. In the context of the example illustrated in flow diagram 500, the host is described with respect to a host/audience model where the host is streaming their play to an audience of users such as users of guest client devices 102b. A multiplayer (MP) service stream (or game session) is created at step 504 responsive to step 502, e.g., by a game/streaming service system or platform configured to stream the title or host multiplayer game sessions. At, or approximately at, the same time, a persisted connection 506, e.g., a WebSocket connection as illustrated, to session tracker 222 is created (and operates as a real time activity (RTA) service instance in this context) which is kept up-to-date on changes to and states of the session. Session tracker 222, acting as an RTA service instance, may operate as a publish/subscribe model service where subscribers receive pushed updates on items in real-/near-real-time.

The host then begins broadcasting, e.g., via the platform, from streamer/host client device 102a at step 508. The host (or streamer in this case) may then decide to create an auto play LFG process at step 510, which will continually pull in new audience members who want to play after each streaming session, as described for the embodiments herein. Details 512 for the LFG process may be auto-filled or customized to include without limitation, the number of users to add to sessions (i.e., user slots), duration of sessions, prioritizing audience members who are subscribers, followers, active in chat, etc., and/or the like. Details 512 may be default options and/or customized via a UI, such as UI 112a (described further below). Creation of the auto play LFG at step 512 causes session queuing service to create the LFG process which may be provided to users via a UI, such as UI 112b (described further below). Additionally, visibility options may allow for the users of the audience to be the only users able to view the LFG process, in embodiments.

Turning now to FIG. 6 and flow diagram 600, this example embodiment is described with respect to a guest client device, such as guest client device 102b of FIG. 1. Flow diagram 600 is also described with respect to flow diagram 500 of FIG. 5, e.g., as a client-side illustration that coincides with flow diagram 500.

A stream viewer (or a user generally) may watch a streamer's/host's broadcast or content stream (or join a multiplayer game session) of a title at step 602 via a client device, such as guest client device 102b. For instance, a stream that is broadcast in step 508 of flow diagram 500 may be viewed. The user may view the stream in a lobby or other online location provided by a game/streaming service system or platform (shown in FIG. 7 below) from which the stream is broadcast. The streamer/host may enable an auto play LFG process for the audience, as in step 510 of flow diagram 500. For example, in an interactive UI, such as UI 112a of FIG. 1, the streamer/host enables a selectable option for the audience users to activate, e.g., UI 112b, to participate in an activity or session of the stream with the streamer/host. The viewer requests to be in the session queue in step 604.

Upon receiving requests from the users, the platform may provide user metadata to the session queuing service in step 606 for any queue prioritization that is to be performed. This metadata may include criteria data described herein that may be stored with user information 224 of FIG. 2. When a user is successfully added to the session queue in step 608, e.g., by session queueing service 208 as described above, the queued user may have a persistent connection, e.g., a WebSocket connection as illustrated, to session tracker 222 established in step 610 to keep the queued user up-to-date on their place in the queue and other updates on the LFG process.

Regarding FIG. 7 and flow diagram 700, this example embodiment is described with respect to a session queuing system, such as queuing system 100 of FIG. 1 and/or system 200. Flow diagram 700 is also described with respect to flow diagram 500 of FIG. 5 and flow diagram 600 of FIG. 6, e.g., as a system level illustration that coincides with these flow diagrams.

When the streamer/host at streamer/host client device 102a has a sufficient amount of interest in the auto play LFG, or when one or more other users are queued, the streamer/host may begin the process of selecting queued users, at one or more guest client devices 102b, for insertion into a session by activating an object to begin on their UI at step 702, e.g., UI 112a of FIG. 1. This activation causes a corresponding notification to be provided to session queueing service 208 to begin selecting the top-most user in the queue and attempting to fill the game session at step 704, e.g., via queue manager 214. In some embodiments, session queueing service 208 may begin selecting users from the queue automatically when a pre-determined number of users are queued (or after a period of time when one or more users are queued).

Session queueing service 208 is configured to automatically provide notifications such as WNS notifications to guest client devices 102b of the selected users at step 706, e.g., via session manager 216. The selected users may respond to the notification by a selectable object in their UI, e.g., UI 112b of FIG. 1, to accept the session invite, or in other embodiments, the selected users in the queue may be provided an informational alert that they are being added to the session without additional user inputs. As each selected user in the queue accepts, they are automatically added to the game session at step 708, e.g., by session manager 216 of session queueing service 208. If a selected user declines or fails to accept the invitation notification for a predetermined period of time, session queueing service 208 is configured to remove that user from the queue, or alternately place that user at the end of the queue, and select the next user at the top of the queue.

Once a session has been populated according to a specified number of participants as described above, the streamer/host may initiate the session as active, while in some other embodiments, the session may be activated automatically. In either case, the session is conducted to its completion. Based on a session state tracked by session tracker 222, at the completion of a session, it is determined if the game/stream has finished at step 710. If the game/stream is finished, the title or session queueing service 208 will remove guest players from the session and disconnect the queued users in step 712, e.g., by session manager 216. If the game/stream is not finished, session queueing service 208 will remove or kick the guest players from the session, e.g., by session manager 216, to free available slots in the session for new guest players and leave just the streamer/host in step 714. Session tracker 222 is configured to relay information between session queueing service 208 and the MP service stream (or game session) at a game/streaming service system or platform 716 of available session slots in the game/stream and of the next users available in the queue. The described processes may then automatically repeat, e.g., starting selecting the next users available in the queue at step 704 and sending WNS game invitations to the selected users at step 706.

During waiting periods while sessions are in progress, any guest players that left the game/stream may be automatically removed from the queue in embodiments, e.g., by queue manager 214. No action by the streamer/host will need to take place for selecting next queued users as new guest players once the process is restarted, because of the automatic nature of the described embodiments, until the streamer/host cancels or ends the game/stream and the sessions. Additionally, the users who are stream viewers or otherwise desire to be activity participants can remain in the queue and see their place in the queue while they wait via their respective UIs.

Thus, the described session participation and queue management systems and processes enable network traffic and load to be greatly reduced for network 110 by reducing communications required for session setup, and power consumption of systems and devices herein is also reduced through seamless iteration of sessions enabling more efficient implementations over current solutions. Furthermore, the current state of the art lacks session participation and queue management systems that are configured and/or programmed to operate in this efficient manner.

B. Example User Interface Embodiments

Users of client devices described herein, e.g., streamer/host client device 102a and/or guest client device 102b as shown in FIG. 1, are configured to interact with each other and with session queueing host 104 of FIG. 1 and/or session queueing host 202 and session queuing service 208 of system 200 in FIG. 2. Streamer/host client device 102a and/or guest client device 102b may be any type of computing device or computing system, including a game console, a terminal, a personal computer, a laptop computer, a tablet device, a smart phone, etc., that may be used by users to play, stream, and/or spectate (i.e., view streams of) titles of title developers. As noted above, such devices may include UIs such as UI 112a and UI 112b of FIG. 1. UIs described herein as well as information/content therefor, may be provided in whole or in part by the titles executed by the client devices or other systems/hosts, may be embedded in the client devices, or any combination thereof.

Figure 8A:
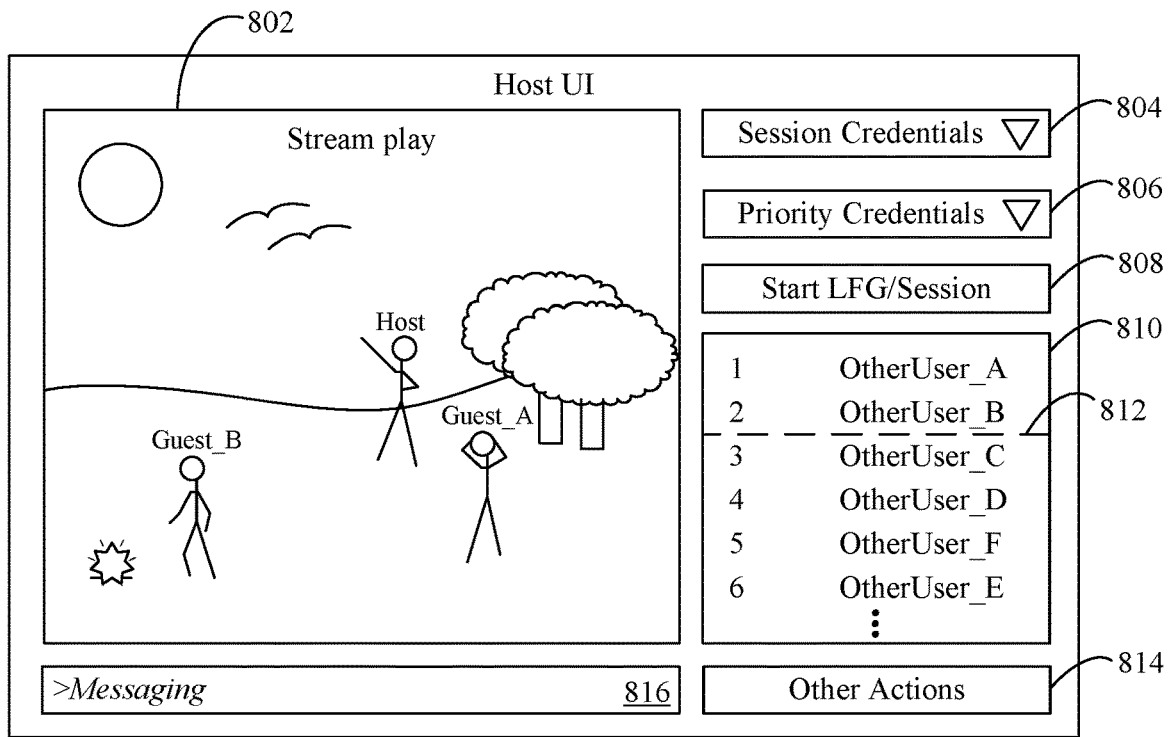
FIG. 8A shows a block diagram of a client user interface for enhancing session participation through queue management, in accordance with an example embodiment.
Figure 8B:
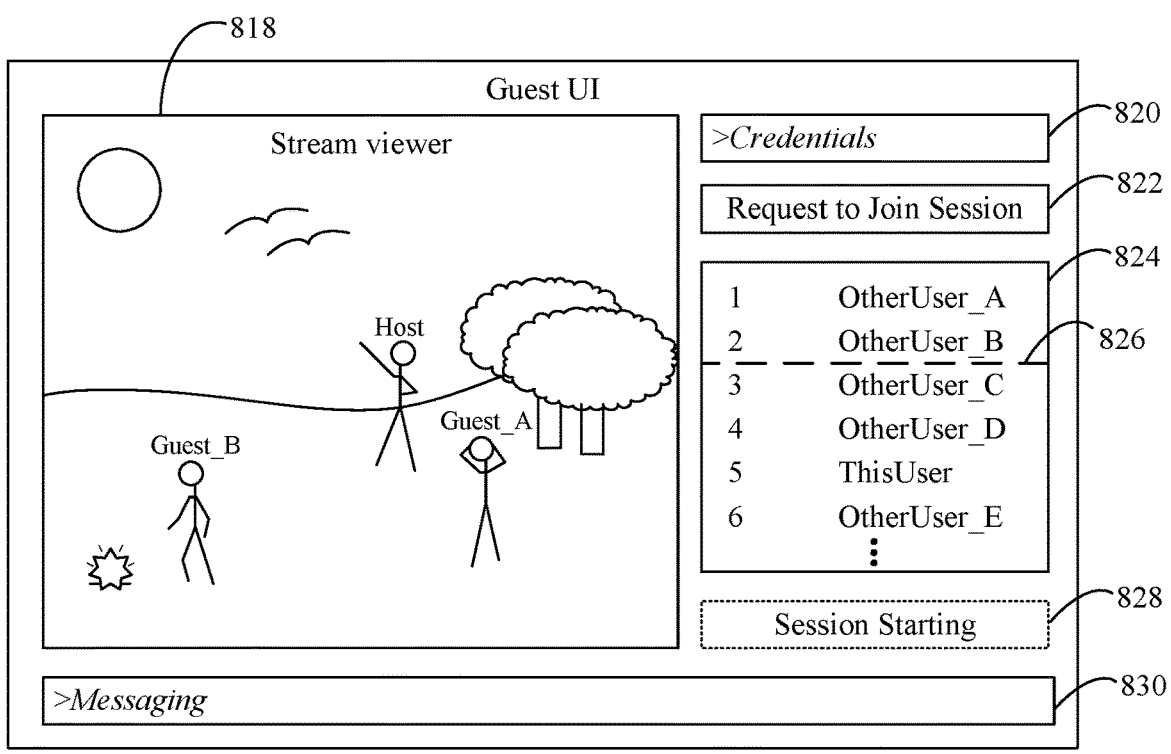
FIG. 8B shows a block diagram of a client user interface for enhancing session participation through queue management, in accordance with an example embodiment.

Turning now to FIGS. 8A and 8B, UIs that are respective embodiments of UI 112a and UI 112b are described.

In FIG. 8A, a block diagram of a host UI 800A is shown. Host UI 800A as illustrated is a further embodiment of UI 112a. Host UI 800A may be a UI provided to streamers/hosts from UI provider(s) 220 of FIG. 2. Host UI 800A is described as follows.

Host UI 800A may include a game/stream play window 802 configured to show activities of a streamer/host as they occur during a stream or game play of a title. Host UI 800A may also include configurable objects that may be selected or interacted with by a streamer/host to configure credentials. For example, a session credentials object 804 and a priority credentials object 806 are shown. Session credentials object 804 and/or priority credentials object 806 may include pull-down menus or other types of expandable interfaces that enable a streamer/host to specify and/or select credentials for implementation in the session participation and queue management embodiments described herein. Session credentials object 804 provides for configuring options related to user credentials for being able to join in sessions of games/streams. As an example, a streamer/host may wish to require that only her followers and friends, or only members of specific communities or groups, be allowed to join and participate in game/stream sessions. It is contemplated, however, that other characteristics/credentials of users may be specified with respect to session credentials object 804. Priority credentials object 806 provides for configuring options related to user credentials for having priority queue placement when requesting to join and participate in sessions of games/streams. As an example, a streamer/host may wish to allow for users having a passcode provided by the streamer/host via a messaging object 816, or subscribers to her streaming channel, to be placed at the top of the queue, but behind others with such characteristics/criteria already queued (i.e., ahead of those queued users without such characteristics/criteria. It is contemplated, however, that other characteristics/credentials of users may be specified with respect to priority credentials object 806.

Host UI 800A may also include a selectable object 808, that when selected, is configured to start a LFG process, i.e., activate a session mode for a stream, to begin participating in sessions for activities with other users. In embodiments, selecting object 808 causes guest UI 800B to display, or make active, one or more portions thereof to a user, as described below. Host UI 800A may also include a representation of a queue, e.g., a queue object 810, in which users are queued according to the described embodiments. Queue object 810 may illustrate the users queued and their location in the queue. Queue object 810 may also provide an indication 812 that denotes the queued users, or the number of queued users, that will be added to the next session (e.g., users in queue positions 1 and 2 as illustrated). In other words, in the embodiment shown, two queued users are allowed as a subset of the queued users to be added for each session for a total of three participants including the streamer/host, although other numbers for subsets of users are contemplated herein. Queue object 810 may illustrate other information/characteristics associated with the users in the queue, e.g., avatar images, badges, subscription indications, and/or the like. In some embodiments, a streamer/host may be enabled by host UI 800A to select specific users from queue object 810 to be prioritized.

Host UI 800A may also include a selectable object 814 for other actions not explicitly shown for illustrative clarity and brevity. Other actions performed upon selection of object 814 may include, without limitation, removing a user from queue object 810, ending a session, ending a stream, beginning a session, setting limits for session participants, setting durations for sessions, displaying session information such as time remaining or session objective progress to guest UIs, and/or the like. In embodiments, selecting object 808 or object 814 may provide a list or history showing session options that have previously been implemented by the streamer/host.

In FIG. 8B, a block diagram of a guest UI 800B is shown. Guest UI 800B as illustrated is a further embodiment of UI 112b. Guest UI 800B may be a UI provided to streamers/hosts from UI provider(s) 220 of FIG. 2. Guest UI 800B may be provided upon entry to a title lobby, a group, etc., by a user. Guest UI 800B is described as follows.

Guest UI 800B may include a game/stream viewer window 818 configured to show activities of a streamer/host as they occur during a stream or game play of a title. Game/stream viewer window 818 may be configured to display session information such as time remaining or session objective progress. Game/stream viewer window 818 may be configured to show a user's participation in sessions of games/streams subsequent to being added thereto, as described herein.

Guest UI 800B may include a credentials object 820, a request to join object 822, a queue object 824, and an alert indication object 828. One or more of these objects may be configured to not be displayed, or as deactivated, prior to a streamer/host activating an LFG process or sessions (e.g., via object 808 of host UI 800A).

Credentials object 820 may be configured to enable a user to enter, or select in some embodiments, credentials to provide to the streamer/host for verification of a permission for the user. For instance, credentials object 820 may be a text field in which a user may enter a passcode provided by a streamer/host via a messaging object 830. Request to join object 822 may be selectable by a user to cause a request to join a session to be sent, as described herein.

Queue object 824 may display a representation of a queue in which users are queued according to the described embodiments. Queue object 824 may illustrate the users queued and their location in the queue, including the user viewing guest UI 800B. Queue object 824 may also provide an indication 826 that denotes the queued users, or the number of queued users, that will be added to the next session (e.g., users in queue positions 1 and 2 as illustrated). In other words, in the embodiment shown, two queued users are allowed as a subset of the queued users to be added for each session for a total of three participants including the streamer/host, although other numbers for subsets of users are contemplated herein.

Alert indication object 828 is configured to provide an alert indication for the initialization of an active session in which the user will participate as a guest player. Alert notifications provided by alert indication object 828 may include visual and/or audible notifications of any type. In embodiments, alert indication object 828 may be configured as a selectable object that is activated by a user to accept an invitation to join a session, as described above. For instance, when a queued user is automatically selected for inclusion in a session and a notification is automatically provided to the user as in steps 704 and 706 of flow diagram 700 in FIG. 7 described above, the user may respond to this notification to accept insertion into the session by selecting alert indication object 828.

These and other functions of host UI 800A and guest UI 800B, as would be understood by persons of skill in the relevant art(s) having the benefit of this disclosure, may be combined with any other embodiments and features of the described systems and devices.

III. Example Mobile Device and Computing Device Embodiments

Embodiments described herein may be implemented in hardware, or hardware combined with software and/or firmware. For example, embodiments described herein may be implemented as computer program code/instructions configured to be executed in one or more processors and stored in a computer readable storage medium. Alternatively, embodiments described herein may be implemented as hardware logic/electrical circuitry.

As noted herein, the embodiments described, including queuing system 100 of FIG. 1, system 200 of FIG. 2, host UI 800A of FIG. 8A, and guest UI 800B of FIG. 8B, along with any components and/or subcomponents thereof, as well as the flowcharts/flow diagrams described herein and/or further examples described herein, may be implemented in hardware, or hardware with any combination of software and/or firmware, including being implemented as computer program code configured to be executed in one or more processors and stored in a computer readable storage medium, or being implemented as hardware logic/electrical circuitry, such as being implemented together in a system-on-chip (SoC), a field programmable gate array (FPGA), or an application specific integrated circuit (ASIC). A SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Embodiments described herein may be implemented in one or more computing devices similar to a mobile system and/or a computing device in stationary or mobile computer embodiments, including one or more features of mobile systems and/or computing devices described herein, as well as alternative features. The descriptions of mobile systems and computing devices provided herein are provided for purposes of illustration, and are not intended to be limiting. Embodiments may be implemented in further types of computer systems, as would be known to persons skilled in the relevant art(s).

Figure 9:
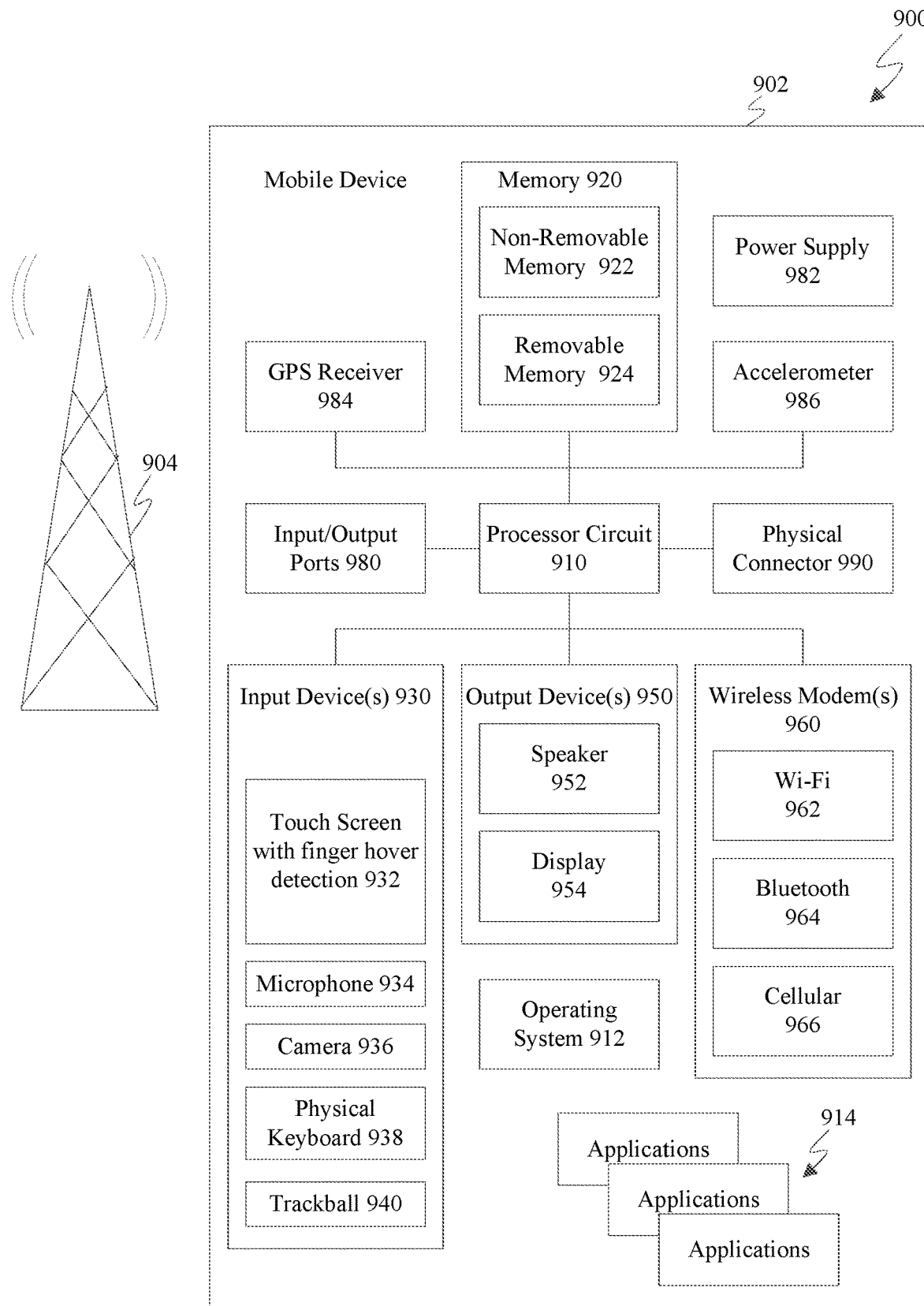
FIG. 9 shows a block diagram of an example mobile device that may be used to implement various example embodiments.

FIG. 9 is a block diagram of an exemplary mobile system 900 that includes a mobile device 902 that may implement embodiments described herein. For example, mobile device 902 may be used to implement any system, client, or device, or components/subcomponents thereof, in the preceding sections. As shown in FIG. 9, mobile device 902 includes a variety of optional hardware and software components. Any component in mobile device 902 can communicate with any other component, although not all connections are shown for ease of illustration. Mobile device 902 can be any of a variety of computing devices (e.g., cell phone, smart phone, handheld computer, Personal Digital Assistant (PDA), etc.) and can allow wireless two-way communications with one or more mobile communications networks 904, such as a cellular or satellite network, or with a local area or wide area network.

Mobile device 902 can include a controller or processor 910 (e.g., signal processor, microprocessor, ASIC, or other control and processing logic circuitry) for performing such tasks as signal coding, data processing, input/output processing, power control, and/or other functions. An operating system 912 can control the allocation and usage of the components of mobile device 902 and provide support for one or more application programs 914 (also referred to as "applications" or "apps"). Application programs 914 may include common mobile computing applications (e.g., e-mail applications, calendars, contact managers, web browsers, messaging applications) and any other computing applications (e.g., word processing applications, mapping applications, media player applications).

Mobile device 902 can include memory 920. Memory 920 can include non-removable memory 922 and/or removable memory 924. Non-removable memory 922 can include RAM, ROM, flash memory, a hard disk, or other well-known memory devices or technologies. Removable memory 924 can include flash memory or a Subscriber Identity Module (SIM) card, which is well known in GSM communication systems, or other well-known memory devices or technologies, such as "smart cards." Memory 920 can be used for storing data and/or code for running operating system 912 and application programs 914. Example data can include web pages, text, images, sound files, video data, or other data to be sent to and/or received from one or more network servers or other devices via one or more wired or wireless networks. Memory 920 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

A number of programs may be stored in memory 920. These programs include operating system 912, one or more application programs 914, and other program modules and program data. Examples of such application programs or program modules may include, for example, computer program logic (e.g., computer program code or instructions) for implementing one or more of queuing system 100 of FIG. 1, system 200 of FIG. 2, host UI 800A of FIG. 8A, and guest UI 800B of FIG. 8B, along with any components and/or subcomponents thereof, as well as the plots and flowcharts/flow diagrams and/or further examples described herein.

Mobile device 902 can support one or more input devices 930, such as a touch screen 932, a microphone 934, a camera 936, a physical keyboard 938 and/or a trackball 940 and one or more output devices 950, such as a speaker 952 and a display 954. Other possible output devices (not shown) can include piezoelectric or other haptic output devices. Some devices can serve more than one input/output function. For example, touch screen 932 and display 954 can be combined in a single input/output device. Input devices 930 can include a Natural User Interface (NUI).

One or more wireless modems 960 can be coupled to antenna(s) (not shown) and can support two-way communications between processor 910 and external devices, as is well understood in the art. Modem 960 is shown generically and can include a cellular modem 966 for communicating with the mobile communication network 904 and/or other radio-based modems (e.g., Bluetooth 964 and/or Wi-Fi 962). At least one wireless modem 960 is typically configured for communication with one or more cellular networks, such as a GSM network for data and voice communications within a single cellular network, between cellular networks, or between the mobile device and a public switched telephone network (PSTN).

Mobile device 902 can further include at least one input/output port 980, a power supply 982, a satellite navigation system receiver 984, such as a Global Positioning System (GPS) receiver, an accelerometer 986, and/or a physical connector 990, which can be a USB port, IEEE 1394 (FireWire) port, and/or RS-232 port. The illustrated components of mobile device 902 are not required or all-inclusive, as any components can be deleted and other components can be added as would be recognized by one skilled in the art.

In an embodiment, mobile device 902 is configured to implement any of the above-described features of flowcharts herein. Computer program logic for performing any of the operations, steps, and/or functions described herein may be stored in memory 920 and executed by processor 910.

Figure 10:
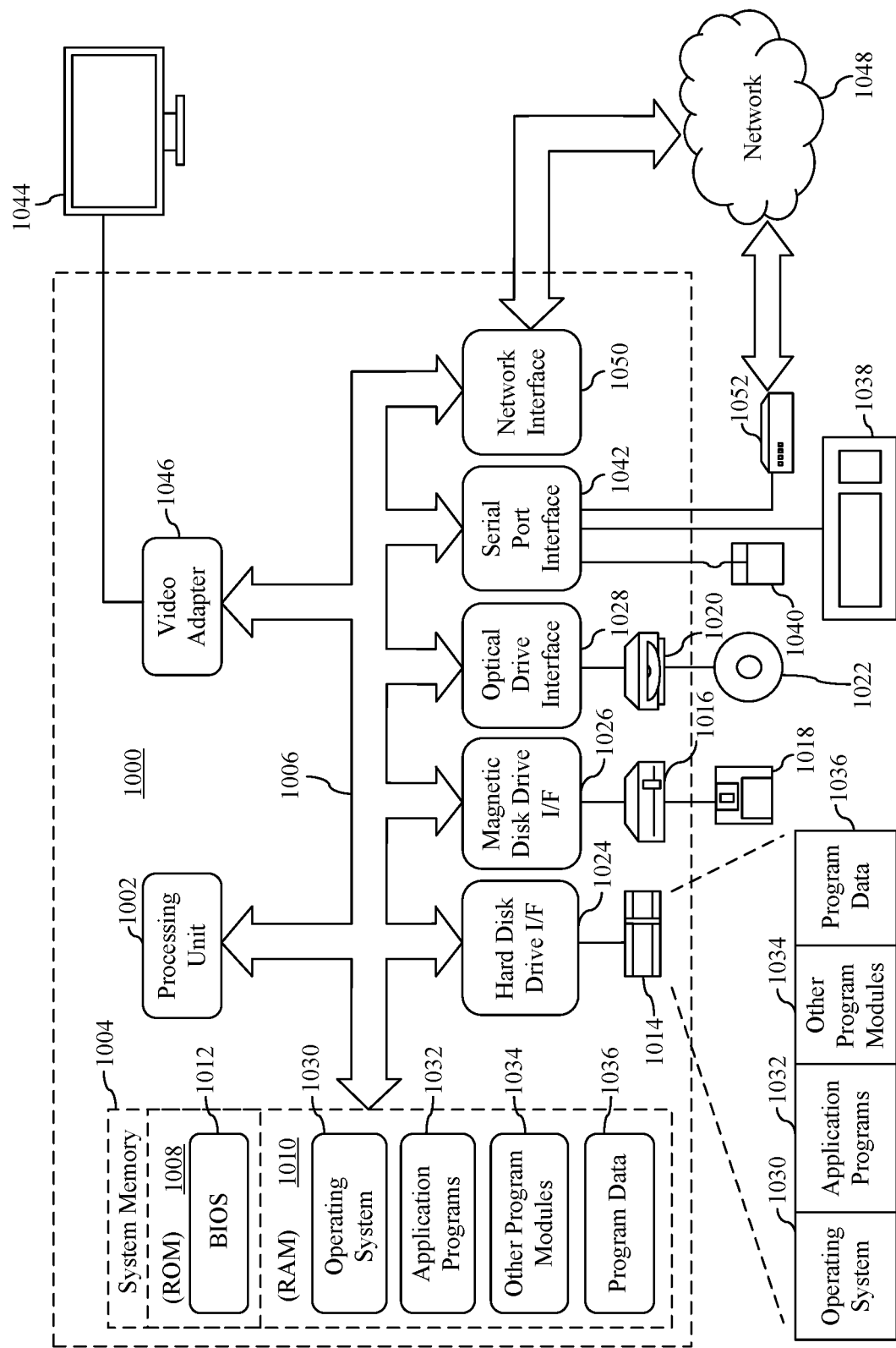
FIG. 10 shows a block diagram of an example computing device that may be used to implement embodiments.

FIG. 10 depicts an exemplary implementation of a computing device 1000 in which embodiments may be implemented. For example, embodiments described herein may be implemented in one or more computing devices similar to computing device 1000 in stationary or mobile computer embodiments, including one or more features of computing device 1000 and/or alternative features. The description of computing device 1000 provided herein is provided for purposes of illustration, and is not intended to be limiting. Embodiments may be implemented in further types of computer systems and/or game consoles, etc., as would be known to persons skilled in the relevant art(s).

As shown in FIG. 10, computing device 1000 includes one or more processors, referred to as processor circuit 1002, a system memory 1004, and a bus 1006 that couples various system components including system memory 1004 to processor circuit 1002. Processor circuit 1002 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 1002 may execute program code stored in a computer readable medium, such as program code of operating system 1030, application programs 1032, other programs 1034, etc. Bus 1006 represents one or more of any of several types of bus structures, including a memory bus or memory controller, a peripheral bus, an accelerated graphics port, and a processor or local bus using any of a variety of bus architectures. System memory 1004 includes read only memory (ROM) 1008 and random access memory (RAM) 1010. A basic input/output system 1012 (BIOS) is stored in ROM 1008.

Computing device 1000 also has one or more of the following drives: a hard disk drive 1014 for reading from and writing to a hard disk, a magnetic disk drive 1016 for reading from or writing to a removable magnetic disk 1018, and an optical disk drive 1020 for reading from or writing to a removable optical disk 1022 such as a CD ROM, DVD ROM, or other optical media. Hard disk drive 1014, magnetic disk drive 1016, and optical disk drive 1020 are connected to bus 1006 by a hard disk drive interface 1024, a magnetic disk drive interface 1026, and an optical drive interface 1028, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 1030, one or more application programs 1032, other programs 1034, and program data 1036. Application programs 1032 or other programs 1034 may include, for example, computer program logic (e.g., computer program code or instructions) for implementing embodiments described herein, such as queuing system 100 of FIG. 1, system 200 of FIG. 2, host UI 800A of FIG. 8A, and guest UI 800B of FIG. 8B, along with any components and/or subcomponents thereof, as well as the plots and flowcharts/flow diagrams described herein and/or further examples described herein.

A user may enter commands and information into the computing device 1000 through input devices such as keyboard 1038 and pointing device 1040. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 1002 through a serial port interface 1042 that is coupled to bus 1006, but may be connected by other interfaces, such as a parallel port, game port, or a universal serial bus (USB).

A display screen 1044 is also connected to bus 1006 via an interface, such as a video adapter 1046. Display screen 1044 may be external to, or incorporated in computing device 1000. Display screen 1044 may display information, as well as being a user interface for receiving user commands and/or other information (e.g., by touch, finger gestures, virtual keyboard, etc.). In addition to display screen 1044, computing device 1000 may include other peripheral output devices (not shown) such as speakers and printers.

Computing device 1000 is connected to a network 1048 (e.g., the Internet) through an adaptor or network interface 1050, a modem 1052, or other means for establishing communications over the network. Modem 1052, which may be internal or external, may be connected to bus 1006 via serial port interface 1042, as shown in FIG. 10, or may be connected to bus 1006 using another interface type, including a parallel interface.

As used herein, the terms "computer program medium," "computer-readable medium," and "computer-readable storage medium," etc., are used to refer to physical hardware media such as the hard disk associated with hard disk drive 1014, removable magnetic disk 1018, removable optical disk 1022, other physical hardware media such as RAMs, ROMs, flash memory cards, digital video disks, zip disks, MEMs, nanotechnology-based storage devices, and further types of physical/tangible hardware storage media (including memory 1020 of FIG. 10). Such computer-readable media and/or storage media are distinguished from and non-overlapping with communication media and propagating signals (do not include communication media and propagating signals). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 1032 and other programs 1034) may be stored on the hard disk, magnetic disk, optical disk, ROM, RAM, or other hardware storage medium. Such computer programs may also be received via network interface 1050, serial port interface 1042, or any other interface type. Such computer programs, when executed or loaded by an application, enable computing device 1000 to implement features of embodiments discussed herein. Accordingly, such computer programs represent controllers of the computing device 1000.

Embodiments are also directed to computer program products comprising computer code or instructions stored on any computer-readable medium or computer-readable storage medium. Such computer program products include hard disk drives, optical disk drives, memory device packages, portable memory sticks, memory cards, and other types of physical storage hardware.

IV. Additional Example and Advantages

As described, systems and devices embodying the techniques herein may be configured and enabled in various ways to perform their respective functions. In embodiments, one or more of the steps or operations of any flowchart and/or flow diagram described herein may not be performed. Moreover, steps or operations in addition to or in lieu of those in any flowchart and/or flow diagram described herein may be performed. Further, in examples, one or more operations of any flowchart and/or flow diagram described herein may be performed out of order, in an alternate sequence, or partially (or completely) concurrently with each other or with other operations.

While embodiments described in the Sections above may be described in the context of a streamer/host user that is streaming a title being viewed by other users, e.g., in a virtual or online lobby associated with the title, the embodiments may also be applied to groups of users that "meet" in virtual or online locations, e.g., a group of friend, to play a game that is not streamed for viewing. For example, a multi-player game session that allows four or eight players to simultaneously participate may be created and hosted by a user that wishes to play with a group of friends. When the group of friends, including the host user, exceeds the number of allowed participants for the game, the embodiments described herein for management of session tracking and automated queuing are equally applicable to such scenarios.

The described embodiments improve not only the experience of users and the performance of their client devices (such as power consumption and reduced processing cycle over-burden by more efficient handling of functions by a central system), as well as the load of the network therebetween, but also improve the performance of game/streaming service systems/platforms. Computing resource utilization for title developers is also reduced (e.g., reduced development time and development processing cycles) via the seamless integration of titles described herein. Additionally, the centrally-located session queuing systems and devices herein provide dynamically configurable queue management for game/stream session participation that is customized for each specific streamer host according to their preferences and the title they are streaming. It should be noted that a "centrally-located" system may include geographically-diverse components (e.g., servers, data centers, etc.) configured to efficiently facilitate the described embodiments in different geographic regions—that is, "centrally-located" may describe the functions and implementation of the described embodiments and/or physical location of the systems. Real-time queue status updates are enabled by the described persistent connections, which also provide for the ability to automatically manage the queues without streamer/host oversight (e.g., removing users from a queue for non-responsiveness or leaving a stream/lobby). Thus, the time waiting to join a session, as well as the complexity of user interaction to join sessions, is greatly reduced by the efficient management and processing of automatic queues for session participation reducing processing requirement at the host/streamer and client devices, the service platform itself, and further reducing network traffic. That is, the managed functions of queuing users that submitted requests to join a session, determining a beginning of the session, and then automatically inserting a predetermined number of the queued users into the session to initiate an active session reduces processing of the client devices and the service platform involved and requires far fewer network communications therebetween. Additionally, determining the completion of a prior active session, and automatically removing all guest players of the prior active session based on the completion and before automatically inserting the predetermined number of the queued users into the session further increases processing efficiency for queue management as described herein and further decreases network communications. Likewise, management such as automatically re-queuing one or more removed guest players of an ended session responsive to their removal, and automatically de-queuing any of the users that leave the activity group further increase queuing efficiency improves queuing efficiency and operation which in turn positively impacts session participation.

Furthermore, the described embodiments do not exist in software implementations for improved participation in online content streams or activities through management of session tracking and automated queuing, e.g., in cloud-based implementations.

Still further, real-time queue status information is automatically provided to streamers/hosts during streaming as well as queued users without additional inputs while viewing a content stream and/or waiting for session participation via guest UIs, and users are automatically inserted into sessions from the queue at the appropriate time, e.g., when a beginning of a session is determined, thus improving the UI functionality and experience. Additionally, streamer/host users are able to view, via host UIs, the queue status as sessions automatically iterate allowing the streamer/host continuous monitoring of session participation and streaming.

It is also contemplated herein that session participation and/or performance may be linked to rewards services associated with the title streamed and/or the game/streaming service or platform used. Rewards may include, without limitation, badges, skins, in-game items, experience points, in-game unlocks, and/or the like.

The additional examples and embodiments described in this Section may be applicable to examples disclosed in any other Section or subsection of this disclosure.

A session queuing system is described herein. The session queuing system may be configured and enabled in various ways to enhance participation in online content streams or activities through management of session tracking and automated queuing, as described herein. The session queuing system includes one or more processors and one or more memories that store program code to be executed by the processor. The program code includes an audience manager, a queue manager, and a session manager. The audience manager is configured to associate users with an activity (e.g., game or video stream) of a host player by including the users in an activity group. The queue manager is configured to receive requests from at least a subset of the users in the activity group to join a session of the activity as guest players, the session including participation in an activity with the host player, and to queue the users that submitted the requests to join the session. The session manager configured to determine a beginning of the session, and to automatically insert a predetermined number of the queued users into the session to initiate an active session.

In an embodiment of the session queuing system, the session manager is configured to track a prior active session that occurs before the active session, and determine the beginning based on a completion of the prior active session.

In an embodiment of the session queuing system, the session manager is configured to determine the completion of the prior active session, and automatically remove all guest players of the prior active session based on the completion and before said automatically inserting the predetermined number of the queued users into the session.

In an embodiment of the session queuing system, the session manager is configured to provide notifications to the predetermined number of the queued the users of their insertion into the session, receive corresponding responses to the notifications, and automatically insert the predetermined number of the queued the users into the session based on the corresponding responses.

In an embodiment of the session queuing system, the queue manager is configured to perform one or more of automatically queue one or more removed guest players of an ended session responsive to their removal, automatically de-queue any of the users that leave the activity group, or prioritize queuing of a user based on a characteristic of the user.

In an embodiment of the session queuing system, the program code further includes a guest user interface (UI) provider configured to provide a guest UI to a user in the activity group, where the guest UI includes at least one of a selectable object that when activated provides a request to join the session of the video stream, a credential portion configured for verification of a permission of the user, an indication of a queue position for the user, or an alert indication for an initialization of the active session in which the user will participate as a guest player.

In an embodiment of the session queuing system, the program code further includes a host user interface (UI) provider configured to provide a host UI to the host player, the host UI including at least one of a selectable object that when activated initiates a session mode in which a guest UI is caused to be provided to a user in the activity group, a first configurable object that specifies credentials for eligible users in the activity group to join the session of the video stream, or a second configurable object that specifies credentials by which the users in the activity group are prioritized in queuing to join the session of the video stream.

A method for session queuing performed on a processing system is also described. The method enhances participation in online content streams or activities through management of session tracking and automated queuing, as described herein. The method includes receiving requests from at least a subset of users in an activity group to join a session of an activity as guest players, the session including participation in an activity with a host player, and queuing the users that submitted the requests to join the session. The method also includes determining a beginning of the session, and automatically inserting a predetermined number of the queued users into the session to initiate an active session.

In an embodiment, the method further includes tracking a prior active session that occurs before the active session, and determining the beginning based on a completion of the prior active session.

In an embodiment, the method further includes determining a completion of the prior active session, and automatically removing all guest players of the prior active session based on the completion and before said automatically inserting the predetermined number of the queued users into the session.

In an embodiment, the method further includes providing notifications to the number of the queued ones of the users for insertion into the session, receiving corresponding responses for the notifications, and automatically inserting the number of the queued ones of the users into the session based also on the corresponding responses.

In an embodiment, the method further includes at least one of automatically queuing one or more removed guest players of an ended session responsive to their removal, automatically de-queuing any of the users that leave the activity group, or prioritizing queuing of a user based on a characteristic of the user.

In an embodiment, the method further includes providing a guest user interface (UI) to each of the users in the activity group, the UI including at least one of a selectable object that when activated provides a request to join the session of the video stream, a credential portion configured for verification of a permission of the user, an indication of a queue position for a user, or an alert indication for an initialization of the active session in which the user will participate as a guest player.

In an embodiment, the method further includes providing a host user interface (UI) to the host player, the UI including at least one of a selectable object that when activated initiates a session mode in which a guest UI is caused to be provided to a user in the activity group, a first configurable object that specifies credentials for eligible users to join the session of the video stream, or a second configurable object that specifies credentials by which users are prioritized in queuing to join the session of the video stream.

A computer-readable medium having program instructions recorded thereon that, when executed by a processing device, perform a method for session queuing is also provided herein. The method enhances participation in online content streams or activities through management of session tracking and automated queuing, as described herein. The method includes associating users with an activity of a host player by including the users in an activity group, and receiving requests from at least a subset of the users in the activity group to join a session of the activity as guest players, the session including participation in an activity with the host player. The method also includes queuing the users that submitted the requests to join the session, determining a beginning of the session, and automatically inserting a predetermined number of the queued users into the session to initiate an active session.

In an embodiment of computer-readable medium, the method further includes tracking a prior active session that occurs before the active session, and determining the beginning based on a completion of the prior active session.

In an embodiment of computer-readable medium, the method further includes determining the completion of the prior active session, and automatically remove all guest players of the prior active session based on the completion and before said automatically inserting the predetermined number of the queued users into the session.

In an embodiment of computer-readable medium, the method further includes providing notifications to the number of the queued ones of the users for insertion into the session, receiving corresponding responses for the notifications, and automatically inserting the number of the queued ones of the users into the session based also on the corresponding responses.

In an embodiment of computer-readable medium, the method further includes at least one of automatically queuing one or more removed guest players of an ended session responsive to their removal, automatically de-queuing any of the users that leave the activity group, or prioritizing queuing of a user based on a characteristic of the user.

In an embodiment of computer-readable medium, the method further includes providing a guest user interface (UI) to a user in the activity group, the guest UI including at least one of a selectable object that when activated provides a request to join the session of the video stream, a credential portion configured for verification of a permission of the user, an indication of a queue position of the user, or an alert indication for an initialization of the active session in which the user will participate as a guest player. In the embodiment, the method also includes providing a host UI to the host player, the host UI including at least one of a selectable object that when activated initiates a session mode in which a guest UI is caused to be provided to each of the users in the activity group, a first configurable object that specifies credentials for eligible users in the activity group to join the session of the video stream, or a second configurable object that specifies credentials by which one or more users in the activity group are prioritized in queuing to join the session of the video stream.

V. Conclusion

While various embodiments of the disclosed subject matter have been described above, it should be understood that they have been presented by way of example only, and not limitation. It will be understood by those skilled in the relevant art(s) that various changes in form and details may be made therein without departing from the spirit and scope of the embodiments as defined in the appended claims. Accordingly, the breadth and scope of the disclosed subject matter should not be limited by any of the above-described exemplary embodiments, but should be defined only in accordance with the following claims and their equivalents.

What is claimed is:

1. A session queuing system comprising:
 a processor; and
 a memory configured to store program code to be executed by the processor, the program code including:
 an audience manager configured to:
  associate users with an activity of a host player by including the users in an activity group;
 a queue manager configured to:
  receive requests from at least a subset of the users in the activity group to join a session of the activity as guest players, the session including participation in the activity with the host player, and
  queue the users that submitted the requests to join the session, the users being prioritized in a queue by the queue manager based at least on information relating to performance by the users in the activity, and
 a session manager configured to:
  determine a beginning of the session,
  automatically insert a first set of users from the queue into the session to initiate an active session, a number of users in the first set corresponding to the activity,
  determine an end of the active session;
  automatically remove the first set of users from the active session; and automatically insert a second set of users from the queue into the session to initiate a second active session, a number of users in the second set corresponding to the activity.

2. The session queuing system of claim 1, wherein the session manager is configured to:
track a prior active session that occurs before the active session, and
determine the beginning of the session based on a completion of the prior active session.

3. The session queuing system of claim 2, wherein the session manager is configured to:
determine the completion of the prior active session, and
automatically remove all guest players of the prior active session based on the completion and before automatically inserting the first set of users into the session.

4. The session queuing system of claim 1, wherein the session manager is configured to:
provide notifications to the first set of users of their insertion into the session;
receive corresponding responses to the notifications; and
automatically insert the first set of users into the session based on the corresponding responses.

5. The session queuing system of claim 1, wherein the queue manager is configured to perform one or more of:
automatically queue one or more removed guest players of an ended session responsive to their removal; and
automatically de-queue any of the users that leave the activity group.

6. The session queuing system of claim 1, wherein the program code further comprises:
a guest user interface (UI) provider configured to provide a guest UI to a particular user in the activity group, the guest UI comprising at least one of:
a selectable object that when activated provides a request to join the session of the activity;
a credential portion configured for verification of a permission of the particular user;
an indication of a queue position for the particular user; or
an alert indication for an initialization of a particular session in which the particular user will participate as a guest player.

7. The session queuing system of claim 1, wherein the program code further comprises:
a host user interface (UI) provider configured to provide a host UI to the host player, the host UI comprising at least one of:
a selectable object that when activated initiates a session mode in which a guest UI is caused to be provided to a particular user in the activity group;
a first configurable object that specifies credentials for eligible users in the activity group to join the session of the activity; or
a second configurable object that specifies credentials by which the users in the activity group are prioritized in the queue by the queue manager.

8. A method for session queuing performed on a processing system, the method comprising:
receiving requests from at least a subset of users in an activity group to join a session of an activity as guest players, the session including participation in the activity with a host player;
adding the users in the subset that submitted the requests to a prioritized queue to join the session, the users in the subset being prioritized in the prioritized queue based at least on previous performance in the activity;
determining a beginning of the session;
automatically inserting a first set of one or more users from the prioritized queue into the session to initiate an active session;
determining an end of the active session;
automatically removing the first set of one or more users from the active session; and
automatically inserting a second set of one or more users from the prioritized queue into the session to initiate a second active session.

9. The method for session queuing of claim 8, further comprising:
tracking a prior active session that occurs before the active session; and
determining the beginning based on a completion of the prior active session.

10. The method for session queuing of claim 9, further comprising:
determining a completion of the prior active session; and
automatically removing all guest players of the prior active session based at least on the completion and before said automatically inserting the first set of one or more users into the session.

11. The method for session queuing of claim 8, further comprising:
maintaining persistent network connections with each user of the subset in the prioritized queue.

12. The method for session queuing of claim 11, further comprising:
notifying individual users in the prioritized queue of corresponding places in the prioritized queue over the persistent network connections.

13. The method for session queuing of claim 8, further comprising:
providing a guest user interface (UI) to a particular user in the activity group, the UI comprising at least one of:
a selectable object that when activated provides a request to join the session of the activity;
a credential portion configured for verification of a permission of the particular user;
an indication of a queue position for the particular user; or
an alert indication for an initialization of a particular active session in which the particular user will participate as a guest player.

14. The method for session queuing of claim 8, further comprising:
providing a host user interface (UI) to the host player, the UI comprising at least one of:
a selectable object that when activated initiates a session mode in which a guest UI is caused to be provided to a particular user in the activity group;
a first configurable object that specifies credentials for eligible users to join the session of the activity; or
a second configurable object that specifies credentials by which respective users are prioritized in queuing to join the session of the activity.

15. A computer-readable medium having program instructions recorded thereon that, when executed by a processing device, cause the processing device to perform acts comprising:
associating users with an activity of a host player by including the users in an activity group;
receiving requests from individual users in the activity group to participate as guest players in the activity with the host player;

adding the individual users that submitted the requests to a queue in a priority order based at least on user information relating to performance by the individual users in the activity;

automatically inserting one or more first users from a top of the queue into a first active session;

determining an end of the first active session;

automatically removing the one or more first users from the first active session; and automatically inserting one or more second users from the top of the queue into a second active session.

16. The computer-readable medium of claim 15, the acts further comprising:

tracking a prior active session that occurs before the first active session; and determining a beginning of the first active session based on a completion of the prior active session.

17. The computer-readable medium of claim 16, the acts further comprising:

determining the completion of the prior active session; and automatically removing all guest players of the prior active session based on the completion and before said automatically inserting the one or more first users into the first active session.

18. The computer-readable medium of claim 15, the acts further comprising:

providing notifications to the one or more first users for insertion into the first active session over a persistent connection that is maintained while the one or more first users are present in the queue;

receiving corresponding responses for the notifications; and automatically inserting the one or more first users into the first active session responsive to receiving the corresponding responses.

19. The computer-readable medium of claim 15, the acts further comprising:

automatically de-queuing individual users that leave the activity group.

20. The computer-readable medium of claim 15, wherein the activity comprises a game and the user information comprises gameplay statistics for the users or rewards earned by the users.

* * * * *